US012694357B2

(12) United States Patent (10) Patent No.: US 12,694,357 B2
Mori (45) Date of Patent: Jul. 28, 2026

(54) INFORMATION PROCESSING SYSTEM, INFORMATION PROCESSING DEVICE, AND DATA GENERATION METHOD

(71) Applicant: Sony Group Corporation, Tokyo (JP)

(72) Inventor: Hiroshi Mori, Tokyo (JP)

(73) Assignee: Sony Group Corporation, Tokyo (JP)

( * ) Notice: Subject to any disclaimer, the term of this patent is extended or adjusted under 35 U.S.C. 154(b) by 76 days.

(21) Appl. No.: 18/835,693

(22) PCT Filed: Feb. 22, 2023

(86) PCT No.: PCT/JP2023/006409
§ 371 (c)(1),
(2) Date: Aug. 2, 2024

(87) PCT Pub. No.: WO2023/171382
PCT Pub. Date: Sep. 14, 2023

(65) Prior Publication Data
US 2025/0148399 A1 May 8, 2025

(30) Foreign Application Priority Data
Mar. 7, 2022 (JP) ................................. 2022-034419

(51) Int. Cl.
*G06Q 10/0639* (2023.01)
*B25J 9/16* (2006.01)
*G06T 7/00* (2017.01)

(52) U.S. Cl.
CPC ........ *G06Q 10/06395* (2013.01); *B25J 9/163* (2013.01); *G06T 7/0004* (2013.01);
(Continued)

(58) Field of Classification Search
CPC ..... G06Q 10/06395; B25J 9/163; B25J 13/00; B25J 9/1633; B25J 9/1653; B25J 9/1664;
(Continued)

(56) References Cited

U.S. PATENT DOCUMENTS

2020/0156211 A1* 5/2020 Kuan ...................... B24B 21/16
2021/0316404 A1* 10/2021 Trapp ................... B23K 31/125
(Continued)

FOREIGN PATENT DOCUMENTS

JP        2005238391 A        9/2005
JP        2007303830 A        11/2007
(Continued)

OTHER PUBLICATIONS

International Search Report (PCT/ISA/210), International Application No. PCT/JP2023/006409, dated Apr. 25, 2023.

*Primary Examiner* — Abby Lin
*Assistant Examiner* — Esvinder Singh
(74) *Attorney, Agent, or Firm* — Michael Best & Friedrich LLP

(57) ABSTRACT

An information processing system according to an aspect of the present disclosure includes an information processing unit that associates quality evaluation information related to quality evaluation of a product for a region to be worked of a work target object with motion history information related to a motion history of a robot device that performs work on the work target object.

20 Claims, 14 Drawing Sheets

WORK EXECUTION                    WORKMANSHIP EVALUATION

(52) U.S. Cl.
CPC ............... *G06T 2207/10016* (2013.01); *G06T 2207/30136* (2013.01)

(58) Field of Classification Search
CPC ......... G06T 7/0004; G06T 2207/10016; G06T 2207/30136; G06T 2207/20081; G05B 2219/35531; G05B 2219/40452; G05B 19/41875; G05B 2219/31359; G05B 2219/32018; G05B 2219/32179; G05B 219/32184; G05B 2219/32187
See application file for complete search history.

(56) References Cited

U.S. PATENT DOCUMENTS

| | | | |
|---|---|---|---|
| 2022/0066435 A1* | 3/2022 | Thimmanaik | G06T 7/0006 |
| 2023/0141876 A1* | 5/2023 | Kabutan | B25J 9/1666 |
| | | | 700/250 |
| 2024/0286290 A1* | 8/2024 | Kimura | B25J 9/1689 |
| 2025/0010471 A1* | 1/2025 | Shimizu | B25J 9/1664 |
| 2025/0045630 A1* | 2/2025 | Hasunuma | G06N 20/00 |

FOREIGN PATENT DOCUMENTS

| | | | |
|---|---|---|---|
| JP | 2008224341 A | 9/2008 |
| JP | 6758696 B1 | 9/2020 |
| WO | WO-2013015292 A1 | 1/2013 |

* cited by examiner

| id | mean | stdev | min | max |
|----|------|-------|-----|-----|
| 1 | 168.65 | 24.98574593··· | 105 | 229 |
| 2 | 181.17 | 24.49287855··· | 121 | 237 |
| 3 | 178.53 | 24.43622515··· | 137 | 252 |
| 4 | 174.96 | 22.35885506··· | 128 | 226 |
| 5 | 169.33 | 25.33458308··· | 112 | 226 |
| 6 | 168.22 | 21.09197951··· | 100 | 218 |
| 7 | 176.88 | 22.62798267··· | 133 | 233 |
| 8 | 163.15 | 27.14825040··· | 92 | 216 |
| 9 | 174.98 | 22.52464428··· | 119 | 218 |
| 10 | 172.42 | 21.54259965··· | 122 | 228 |

FIG.6

OBJECT

A1

Z

101c

101c

LENS

B

F

IMAGING
SURFACE

LEFT
FOCUS

D

RIGHT
FOCUS

101a

101

101b

ENVELOPE DATA OF
AVERAGE VALUE IN ROI

INFORMATION PROCESSING SYSTEM, INFORMATION PROCESSING DEVICE, AND DATA GENERATION METHOD

FIELD

The present disclosure relates to an information processing system, an information processing device, and a data generation method.

BACKGROUND

In recent years, as a method of evaluating quality (workmanship) of a product of metal processing work such as welding or grinding and coating work, many methods of appearance inspection by image processing have been proposed (see, for example, Patent Literature 1 to 3.). In addition, various kinds of work such as metal processing work and coating work may be executed by a robot device, and it is important to evaluate quality of a product by the work.

CITATION LIST

Patent Literature

Patent Literature 1: Japanese Patent Application Laid-open No. 2008-224341
Patent Literature 2: Japanese Patent No. 6758696
Patent Literature 3: Japanese Patent Application Laid-open No. 2007-303830

SUMMARY

Technical Problem

Although being effective as a method of evaluating quality of a work product, all of the techniques described above do not specify a work factor causing the quality. That is, it is required not only to evaluate superiority or inferiority of the quality of the work product but also to clarify the work factor that causes the evaluation result and lead to work improvement, and to stably produce a product with good quality.

Thus, the present disclosure proposes an information processing system, information processing device, and data generation method capable of stably producing high-quality products.

Solution to Problem

An information processing system according to an aspect of the present disclosure includes: an information processing unit that associates quality evaluation information related to quality evaluation of a product for a region to be worked of a work target object with motion history information related to a motion history of a robot device that performs work on the work target object.

An information processing device according to an aspect of the present disclosure includes: an information processing unit that associates quality evaluation information related to quality evaluation of a product for a region to be worked of a work target object with motion history information related to a motion history of a robot device that performs work on the work target object.

A data generation method according to an aspect of the present disclosure includes: associating quality evaluation information related to quality evaluation of a product for a region to be worked of a work target object with motion history information related to a motion history of a robot device that performs work on the work target object.

BRIEF DESCRIPTION OF DRAWINGS

FIG. 6 is a view illustrating an example of the evaluation image of the surface to be cut of the object to be ground, a motion trajectory of a robot device, and work statistical data according to the embodiment of the present disclosure.

DESCRIPTION OF EMBODIMENTS

In the following, embodiments of the present disclosure will be described in detail on the basis of the drawings. Note that a system, device, method, and the like according to the present disclosure are not limited by the embodiments. Also, in each of the following embodiments, overlapped description is omitted by assignment of the same reference sign to parts that are basically the same.

Each of one or a plurality of embodiments (including examples and modification examples) described in the following can be performed independently. On the other hand, at least a part of the plurality of embodiments described in the following may be appropriately combined with at least a part of the other embodiments. The plurality of embodiments may include novel features different from each other. Thus, the plurality of embodiments can contribute to solving different objects or problems, and can exhibit different effects.

The present disclosure will be described in the following order of items.

1. Embodiment
1-1. Configuration example of an information processing system
1-2. Example of grinding work and quality evaluation work
1-3. Example of data generation processing related to the grinding work and the quality evaluation work
1-4. Specific example of an evaluation method of a surface to be cut
1-5. Specific example of an evaluation method of a surface to be coated
1-6. Configuration example of a work evaluation model generation system
1-7. Configuration example of a work intention interpretation model generation system
1-8. Action/effect
2. Other Embodiments
3. Configuration example of hardware
4. Supplementary note

1. Embodiment

<1-1. Configuration Example of Information Processing System>

Figure 1:
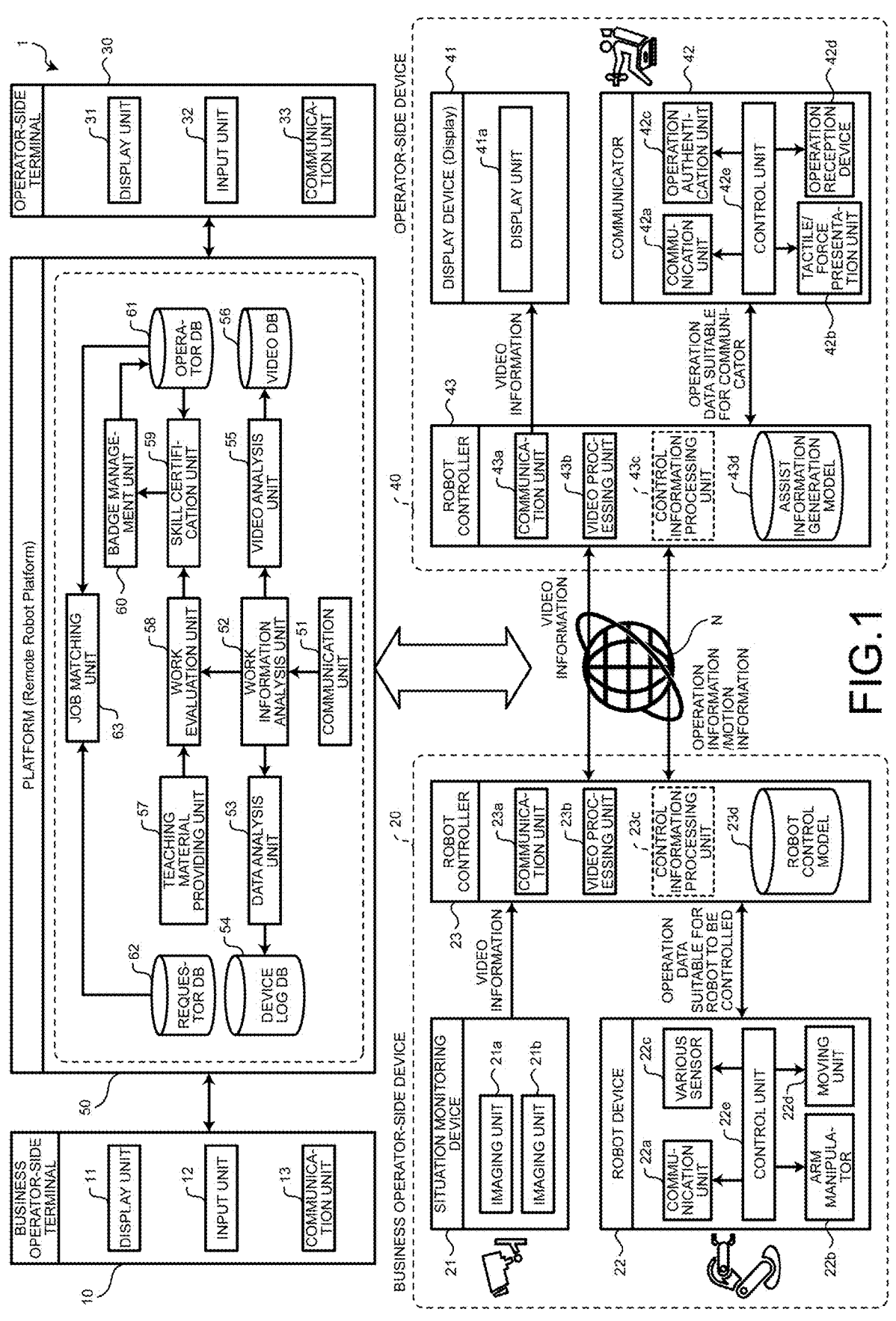
FIG. 1 is a view illustrating an example of a schematic configuration of an information processing system according to an embodiment of the present disclosure.

A configuration example of an information processing system 1 according to the embodiment will be described with reference to FIG. 1. FIG. 1 illustrates one example of a schematic configuration of the information processing system 1 according to the embodiment. The information processing system 1 according to the embodiment provides a remote robot control system, a workflow management system, and a job matching system.

As illustrated in FIG. 1, the information processing system 1 according to the embodiment includes a business-operator-side terminal 10, a business-operator-side apparatus 20, an operator-side terminal 30, an operator-side apparatus 40, and a remote robot platform (platform) 50. These units 10, 20, 30, 40, and 50 can communicate (transmit and receive) various pieces of information via both or one of wireless and wired networks N. Each of the units 10, 20, 30, 40, and 50 functions as an information processing apparatus. Various pieces of information are desirably transmitted and received in an encrypted manner, but this is not a limitation. Note that FIG. 1 merely illustrates an example. The units 10, 20, 30, 40, and 50 are not required to be one apparatus, but may be distributed. Furthermore, the number of the units 10, 20, 30, 40, and 50, the networks N, and the like is not limited.

A network N is a communication network such as a local area network (LAN), a wide area network (WAN), a cellular network, a fixed telephone network, a regional Internet protocol (IP) network, and the Internet. The network N may include a wired network or a wireless network. Furthermore, the network N may include a core network. The core network includes, for example, an evolved packet core (EPC) and a 5G core network (5GC). Furthermore, the network N may include a data network other than the core network. For example, the data network may be a service network of a telecommunications carrier, for example, an IP multimedia subsystem (IMS) network. Furthermore, the data network may be a private network, such as an intra-company network. Furthermore, the network N may include a software defined network (SDN).

Furthermore, a communication apparatus used for communication may be connected to the network N by using radio access technology (RAT) such as long term evolution (LTE), new radio (NR), Wi-Fi (registered trademark), and Bluetooth (registered trademark). In this case, the communications apparatus may be able to use different types of radio access technology. For example, the communication apparatus may be able to use NR and Wi-Fi. Furthermore, the communication apparatus may be able to use different types of cellular communication technology (e.g., LTE and NR). LTE and the NR are types of the cellular communication technology, and enable mobile communication of a communication apparatus by arranging a plurality of areas covered by a base station in a cell shape.

(Business-Operator-Side Terminal)

The business-operator-side terminal 10 is used by a business operator (e.g., requester and supervisor). The business-operator-side terminal 10 exchanges various pieces of information such as business-operator information and operator information with the platform 50. The business-operator information includes, for example, various pieces of information such as a business-operator identification (ID) and recruitment information. Furthermore, the operator information includes various pieces of information such as an operator ID and a skill level of an operator. The business-operator-side terminal 10 includes, for example, a personal computer (e.g., laptop computer and desktop computer), a smart device (e.g., smartphone and tablet), a personal digital assistant (PDA), and a mobile phone.

The business-operator-side terminal 10 as described above includes a display unit 11, an input unit 12, and a communication unit 13. Note that FIG. 1 illustrates a functional configuration, and a hardware configuration may be different from the functional configuration. Furthermore, the functions of the business-operator-side terminal 10 may be distributed and implemented in a plurality of physically separated configurations.

The display unit 11 is a display apparatus that displays various pieces of information. The display unit 11 includes, for example, a liquid crystal display and an organic electro luminescence (EL) display. Note that, when a touch panel is adopted as the business-operator-side terminal 10, the display unit 11 may be an apparatus integrated with an operation apparatus of the input unit 12. The display unit 11 displays various pieces of information, and provides the information to the business operator.

The input unit 12 is an input apparatus that receives various inputs from the outside. The input unit 12 includes an operation apparatus that receives an input operation of the business operator. The operation apparatus is an apparatus for a user to perform various operations, such as a keyboard, a mouse, and an operation key. Note that, when a touch panel is adopted as the business-operator-side terminal 10, the operation apparatus also includes the touch panel. In this case, the business operator performs various operations by touching a screen with his/her finger or a stylus. Furthermore, the operation apparatus may be a voice input apparatus (e.g., microphone) that receives an input operation through voice of the business operator.

The communication unit 13 is a communication interface for communicating with another apparatus. The communication unit 13 communicates with the platform 50, for example. The communication unit 13 includes, for example, various communication interfaces such as a wired interface and a wireless interface.

(Business-Operator-Side Apparatus)

The business-operator-side apparatus 20 includes a status monitoring apparatus 21, a robot apparatus 22, and a robot controller 23. Note that FIG. 1 illustrates a functional configuration, and a hardware configuration may be different from the functional configuration. Furthermore, the functions of the business-operator-side apparatus 20 may be distributed and implemented in a plurality of physically separated configurations.

The status monitoring apparatus 21 includes a plurality of imaging units 21a and 21b. Each of the imaging units 21a and 21b is a camera that captures a video and acquires an image. For example, each of the imaging units 21a and 21b captures a bird's-eye video and a hand-side video (plurality of bird's-eye images and plurality of hand-side images). In one example, the imaging unit 21a captures a bird's-eye video, and the imaging unit 21b captures a hand-side video. Various cameras including an imaging element such as a charge-coupled device (CCD) and a complementary metal-oxide semiconductor (CMOS) can be used as the imaging units 21a and 21b.

The robot apparatus 22 includes a communication unit 22a, an arm manipulator 22b, various sensors 22c, a moving unit 22d, and a control unit 22e. The robot apparatus 22 is to be remotely operated.

The communication unit 22a is a communication interface for communicating with another apparatus. The communication unit 22a communicates with, for example, the robot controller 23. The communication unit 22a includes various communication interfaces such as a wired interface and a wireless interface.

The arm manipulator 22b is, for example, a robot arm having multiple joints (multiple shafts). The arm manipulator 22b enables work in three-dimensional space. Note that the arm manipulator 22b may include a robot hand, which is one example of an end effector. There are many types of robot hands, and the robot hands differ depending on the business contents (e.g., work contents) of the business operator.

The various sensors 22c belong to a sensor group that detects the state of the arm manipulator 22b. The various sensors 22c include various sensors that detect, for example, a torque, an angle, an angular velocity, and the like of a joint portion of an arm, a position and a speed of a distal end of the arm, a tactile sense, and a force sense. For example, the angle of the joint portion is acquired from an encoder in an actuator provided in the joint portion.

The moving unit 22d moves the arm manipulator 22b. For example, the moving unit 22d moves the arm manipulator 22b itself in a horizontal plane or a vertical plane. The moving unit 22d may move the arm manipulator 22b in a direction of one axis (X axis), two axes (XY axes), and three axes (XYZ axes). When the arm manipulator 22b does not need to be moved, the moving unit 22d is unnecessary.

The control unit 22e is a controller that controls each unit of the robot apparatus 22. The control unit 22e controls the arm manipulator 22b based on, for example, operation information transmitted from the robot controller 23. The control unit 22e is implemented by a processor such as a central processing unit (CPU) and a micro processing unit (MPU). Note that the control unit 22e may be implemented by an integrated circuit such as an application specific integrated circuit (ASIC) and a field programmable gate array (FPGA). All of the CPU, the MPU, the ASIC, and the FPGA can be regarded as controllers.

The robot controller 23 includes a communication unit 23a, a video processing unit 23b, a control information processing unit 23c, and a robot control model 23d.

The communication unit 23a is a communication interface for communicating with another apparatus. The communication unit 23a communicates with, for example, the status monitoring apparatus 21, the robot apparatus 22, the operator-side apparatus 40, and the platform 50. The communication unit 23a includes, for example, various communication interfaces such as a wired interface and a wireless interface.

The video processing unit 23b processes video information transmitted from the status monitoring apparatus 21, and transmits the video information to the communication unit 23a. For example, the video processing unit 23b encodes (e.g., encrypts or compresses) the video information transmitted from the status monitoring apparatus 21, and transmits the encoded video information to the communication unit 23a. The communication unit 23a transmits the video information to the operator-side apparatus 40, the platform 50, and the like.

The control information processing unit 23c generates operation information suitable for the robot apparatus 22 based on the operation information transmitted from the operator-side apparatus 40 or the operation information transmitted from the operator-side apparatus 40 and the robot control model 23d based on the robot control model 23d, and transmits the generated operation information to the robot apparatus 22. Furthermore, the control information processing unit 23c encodes (e.g., encrypts or compresses) motion information obtained from the robot apparatus 22, as necessary, and transmits the encoded motion information to the communication unit 23a. The communication unit 23a transmits the motion information to the operator-side apparatus 40, the platform 50, and the like. Furthermore, the control information processing unit 23c decodes the operation information transmitted from the operator-side apparatus 40, as necessary.

Note that the robot controller 23 can also be implemented in a form in which a software development kit (SDK) is incorporated in an existing robot control PC. In this case, executing a disclosed application programming interface (API) enables communication between the outside and the business-operator-side apparatus 20. A developer can implement a new function in an application with less effort by using the SDK, The robot control model 23d is a control information model for automatically controlling the robot apparatus 22. The robot control model 23d is stored in a storage apparatus such as a storage, and is read and used by the control information processing unit 23c.

Note that, although, in an example of FIG. 1, the business-operator-side apparatus 20 includes two imaging units (imaging units 21a and 21b) and one robot apparatus 22, the number thereof is merely an example. In practice, the imaging units 21a and 21b and the robot apparatus 22 are provided in accordance with the number of work processes, work contents, and the like, so that a large number of imaging units 21a and 21b and robot apparatuses 22 are commonly provided.

(Operator-Side Terminal)

The operator-side terminal 30 is used by an operator. The operator-side terminal 30 exchanges various pieces of information such as business-operator information and operator information with the platform 50. For example, similarly to the business-operator-side terminal 10, the operator-side terminal 30 includes a personal computer (e.g., laptop computer and desktop computer), a smart device (e.g., smartphone and tablet), a PDA, and a mobile phone.

Similarly to the business-operator-side terminal 10, the operator-side terminal 30 as described above includes a display unit 31, an input unit 32, and a communication unit 33. Note that FIG. 1 illustrates a functional configuration, and a hardware configuration may be different from the functional configuration. Furthermore, the functions of the operator-side terminal 30 may be distributed and implemented in a plurality of physically separated configurations.

The display unit 31 is a display apparatus that displays various pieces of information. The display unit 31 is, for example, a liquid crystal display and an organic EL display. Note that, when a touch panel is adopted as the operator-side terminal 30, the display unit 31 may be an apparatus integrated with an operation apparatus of the input unit 32. The display unit 31 displays various pieces of information, and provides the information to the operator.

The input unit 32 is an input apparatus that receives various inputs from the outside. The input unit 32 includes an operation apparatus that receives an input operation of the operator. The operation apparatus is an apparatus for a user to perform various operations, such as a keyboard, a mouse, and an operation key. Note that, when a touch panel is adopted as the operator-side terminal 30, the operation apparatus also includes the touch panel. In this case, the operator performs various operations by touching a screen with his/her finger or a stylus. Furthermore, the operation apparatus may be a voice input apparatus (e.g., microphone) that receives an input operation through voice of the operator.

The communication unit 33 is a communication interface for communicating with another apparatus. The communication unit 33 communicates with the platform 50, for example. The communication unit 33 includes, for example, various communication interfaces such as a wired interface and a wireless interface.

(Operator-Side Apparatus)

The operator-side apparatus 40 includes a display apparatus 41, a communicator 42, and a robot controller 43. Note that FIG. 1 illustrates a functional configuration, and a hardware configuration may be different from the functional configuration. Furthermore, the functions of the operator-side apparatus 40 may be distributed and implemented in a plurality of physically separated configurations.

The display apparatus 41 includes a display unit 41a. The display unit 41a is, for example, a liquid crystal display and an organic EL display. Although, in the example of FIG. 1, one display unit 41a is provided, this is not a limitation. A plurality of display units 41a may be provided. The display unit 41a displays various pieces of information including video information, and provides the information to the operator.

Note that the type of the display unit 41a is not particularly limited. For example, the display unit 41a may be an xR device such as an augmented reality (AR) device, a virtual reality (VR) device, and a mixed reality (MR) device. Here, the xR device may be a spectacle-type device (e.g., AR/MR/VR glasses) or a head-mounted or goggle-type device (e.g., AR/MR/VR headsets and AR/MR/VR goggles). These xR devices may display a video only to one eye, or may display a video to both eyes.

The communicator 42 includes a communication unit 42a, a tactile sense/force sense presentation unit 42b, an operation authentication unit 42c, an operation reception device 42d, and a control unit 42e. The communicator 42 is an apparatus used by the operator for a remote operation.

The communication unit 42a is a communication interface for communicating with another apparatus. The communication unit 42a communicates with, for example, the robot controller 43. The communication unit 42a includes, for example, various communication interfaces such as a wired interface and a wireless interface.

The tactile sense/force sense presentation unit 42b is an apparatus that presents a tactile sense and a force sense to the operator. This enables the operator to remotely operate the robot apparatus 22 while obtaining a tactile sense such as hardness/softness of an object and a force sense such as a force level in a case where the object is handled.

The operation authentication unit 42c authenticates an input operation of the operator to the operation reception device 42d. For example, the operation authentication unit 42c authenticates only an input operation of the operator permitted to perform an operation. Various authentication methods such as operator identification (ID) authentication, password authentication, and face authentication can be used as the authentication method.

The operation reception device 42d is an input unit that receives an input operation of the operator. The operation reception device 42d is an apparatus for the user to perform various operations, such as a handle, a joystick, a button, a keyboard, a mouse, and an operation key. The operator operates the operation reception device 42d, and remotely performs work with the robot apparatus 22. In this case, the operator operates the operation reception device 42d while looking at the display unit 41a to recognize video information.

The control unit 42e is a controller that controls each unit of the communicator 42. The control unit 42e is implemented by a processor such as a CPU and an MPU. Note that the control unit 42e may be implemented by an integrated circuit such as an ASIC and an FPGA. All of the CPU, the MPU, the ASIC, and the FPGA can be regarded as controllers.

The robot controller 43 includes a communication unit 43a, a video processing unit 43b, a control information processing unit 43c, and an assist information generation model 43d.

The communication unit 43a is a communication interface for communicating with another apparatus. The communication unit 43a communicates with, for example, the display apparatus 41, the communicator 42, the business-operator-side apparatus 20, and the platform 50. The communication unit 43a includes, for example, various communication interfaces such as a wired interface and a wireless interface.

The video processing unit 43*b* processes video information transmitted from the business-operator-side apparatus 20, and transmits the video information to the communication unit 43*a*. For example, the video processing unit 43*b* decodes the video information transmitted from the business-operator-side apparatus 20, as necessary, and transmits the decoded video information to the communication unit 43*a*. The communication unit 43*a* transmits the video information to the display apparatus 41. The display unit 41*a* displays the video information.

The control information processing unit 43*c* generates operation information suitable for the communicator 42 based on the assist information generation model 43*d*, and transmits the generated operation information to the communicator 42. Furthermore, the control information processing unit 43*c* encodes (e.g., encrypts or compresses) the operation information transmitted from the communicator 42, as necessary, and transmits the encoded operation information to the communication unit 43*a*. The communication unit 43*a* transmits the operation information to the business-operator-side apparatus 20, the platform 50, and the like.

The assist information generation model 43*d* is a model for generating assist information. The assist information is used for assisting an operation of the operator, for example. The assist information generation model 43*d* is stored in a storage apparatus such as a storage, and is read and used by the control information processing unit 43*c*.

(Platform)

The platform 50 includes a communication unit 51, a work information analysis unit 52, a data analysis unit 53, a device log database (DB) 54, a video analysis unit 55, a video DB 56, a teaching material provision unit 57, a work evaluation unit 58, a skill certification unit 59, a badge management unit 60, an operator DB 61, a requester DB 62, and a job matching unit 63.

Note that the platform 50 is a server that manages various pieces of information, for example. For example, the platform 50 manages various pieces of information on the business-operator-side terminal 10, the business-operator-side apparatus 20, the operator-side terminal 30, and the operator-side apparatus 40, and relays exchange of the various pieces of information. For example, a cloud server, a PC server, a midrange server, and a mainframe server can be used as the server. Furthermore, the functions of the server may be configured by, for example, a plurality of servers, or may be implemented by being divided into a plurality of physically separated configurations.

The communication unit 51 is a communication interface for communicating with another apparatus. The communication unit 51 communicates with, for example, the business-operator-side terminal 10, the business-operator-side apparatus 20, the operator-side terminal 30, and the operator-side apparatus 40. The communication unit 51 includes, for example, various communication interfaces such as a wired interface and a wireless interface.

The work information analysis unit 52 analyzes the encoded work information (e.g., operation information/motion information and video information) transmitted from the communication unit 51. For example, the work information analysis unit 52 decodes the work information transmitted from the communication unit 51, as necessary. The work information analysis unit 52 transmits the decoded operation information/motion information to the data analysis unit 53, and transmits the decoded video information to the video analysis unit 55. Furthermore, the work information analysis unit 52 transmits the decoded work information to the work evaluation unit 58. Note that the work information tion is associated with identification information of the operator (e.g., operator ID). The work information may include identification information of the robot apparatus 22 (e.g., robot ID), as necessary.

The data analysis unit 53 analyzes the operation information/motion information transmitted from the work information analysis unit 52, and transmits analysis result information on the analysis result to the device log DB 54 together with the operation information/motion information. For example, the data analysis unit 53 analyzes whether or not the operation information/motion information is appropriate by error detection, a correction code, and the like. Furthermore, the data analysis unit 53 analyzes the operation information/motion information by machine learning (e.g., deep learning) or the like. The analysis result information is associated with an operator ID, and is associated with target operation information/motion information.

The device log DB 54 stores the analysis result information and the operation information/motion information transmitted from the data analysis unit 53 as log information. The log information is associated with an operator ID. The log information is read and used, as necessary.

The video analysis unit 55 analyzes the video information transmitted from the work information analysis unit 52, and transmits analysis result information on the analysis result to the video DB 56 together with the video information. For example, the video analysis unit 55 analyzes whether or not the video information is appropriate by error detection, a correction code, and the like. Furthermore, for example, the video analysis unit 55 has a target determination function using image recognition technology, analyzes video information by the target determination function (image recognition processing), and determines a desired object from the video information. The analysis result information is associated with an operator ID, and is associated with target video information. Note that the target determination function may be implemented by machine learning (e.g., deep learning) and the like.

The video DB 56 stores the analysis result information and the video information transmitted from the video analysis unit 55. The analysis result information and the video information are associated with the operator ID. The analysis result information and the video information are read and used, as necessary.

The teaching material provision unit 57 transmits teaching material information on a teaching material to the work evaluation unit 58. The teaching material information includes, for example, non-defective product information on a non-defective product and motion information on a motion path of the robot apparatus 22 to be a work model, and the like. The non-defective product information is, for example, range information on a specified range to be a work target. Examples of the non-defective product information include information in which the specified range is specified by a numerical value of plus or minus to a target value. Furthermore, in the motion information, the motion path is specified based on coordinates of three-dimensional space, for example. Note that the teaching material information may be obtained by machine learning, simulation, and the like.

The work evaluation unit 58 evaluates a work skill (operation skill) of the operator to the robot apparatus 22 to be remotely operated based on the teaching material information transmitted from the teaching material provision unit 57, the work information (e.g., operation information/motion information and video information) transmitted from the work information analysis unit 52, and the like, and transmits evaluation result information on the evaluation result to the skill certification unit 59. The evaluation result information is associated with the operator ID. For example, the work evaluation unit 58 compares the teaching material information with the work information to determine whether the work is good or bad (e.g., work quality), and evaluates the work skill. In the evaluation of the work skill, for example, a skill certification value for certifying the work skill of the operator is determined.

The skill certification unit 59 certifies a skill of the operator identified by the operator ID based on the evaluation result information transmitted from the work evaluation unit 58, the operator information from the operator DB 61, and the like, and transmits certification result information on the certification result to the badge management unit 60. The certification result information is associated with the operator ID.

The badge management unit 60 issues a digital badge (certification digital badge) to the operator identified by the operator ID based on the certification result information transmitted from the skill certification unit 59, and transmits badge information on a result of the issuance of the digital badge to the operator DB 61. The badge information is included in the operator information, and is associated with the operator ID. In the issuance of a digital badge, for example, the badge is issued in accordance with a skill certification value. In one example, when a skill certification value of the operator is a predetermined threshold or more, a digital badge is given to the operator. The digital badge is issued/operated without being tampered by, for example, blockchain technology.

The operator DB 61 stores operator information on the operator. The operator information includes, for example, an operator ID, profile information on the operator, work history information (operation history information) on the operator, and work environment information (operation environment information) on the operator. Each of these pieces of information is associated with the operator ID. Note that the profile information includes the badge information transmitted from the badge management unit 60. The operator information is read and used, as necessary. For example, the badge information is read from the operator DB 61 based on the operator ID and updated each time the badge management unit 60 issues a digital badge to the operator to whom the badge is to be issued.

The profile information relates to a profile of the operator. The profile information includes, for example, work evaluation result information on a result of evaluation of work performed by an operation of the operator. The work evaluation result information includes, for example, evaluation information such as comprehensive evaluation on a system or in the outside and evaluation for each work. The evaluation information includes, for example, badge information. Examples of an operator skill to be evaluated include a technical skill, a knowledge skill, a general-purpose skill, and characteristics of the operator. Furthermore, the profile information includes history information on, for example, one or both of a history of participations in a course of the operator on a system or in the outside and a history of evaluations of work performed by an operation of the operator. The history information includes information such as a history of participations in a course of E-learning and a history of acquisitions of a digital badge.

The work history information includes, for example, career information on the career of the operator and work environment history information on a work environment history of the operator. The career information includes, for example, career information and conflict information on a system. Furthermore, the work environment history information includes information on a degree of stability of past communication and security literacy, for example.

The work environment information includes, for example, communication status monitoring information on the communication status of a work environment and access source monitoring information on the status of the work environment. The communication status monitoring information includes, for example, information such as a communication status. Furthermore, the access source monitoring information includes, for example, information such as whether or not a work environment is in a conspicuous place.

The requester DB 62 stores requester information on a requester, that is, business-operator information. The business-operator information includes, for example, business operator identification information (e.g., business operator ID) and business operator recruitment information. The business-operator information is associated with a business operator ID. The business-operator information is read and used, as necessary. The recruitment information includes various pieces of information on recruitment, such as entry conditions, work contents, and a salary.

The job matching unit 63 matches an operator (worker) with a business operator based on operator information stored in the operator DB 61 and business-operator information stored in the requester DB 62. Examples of the business operator include a metalworking industry, a pharmaceutical manufacturing industry, and a distribution industry (example of attribute of business operator). Furthermore, examples of the operator include an operator engaged in the distribution industry, an operator engaged in a metal industry, and a skilled operator (example of attribute of operator). Examples of the skilled operator (skilled worker) include an operator engaged in a plurality of types of industries. The skilled operator is determined by years of experience, the number of badges, skills, and the like. For example, an operator having years of experience, the number of badges, the number of skills, and a skill value higher than a predetermined value is defined as a skilled operator. Note that examples of the work include various kinds of work such as various kinds of manufacturing, cutting, grinding, casting, forging, welding, and soldering.

Here, the operator information includes, for example, badge information indicating the number of badges corresponding to the operator ID. For example, a digital badge is issued to the operator for each type of industry in which the operator is engaged. One digital badge is issued to an operator who has been engaged in one type of industry and certified to be skilled in the type of industry. The digital badge proves skill certification in the type of industry in which the operator has been engaged. Furthermore, two digital badges are issued to an operator who has been engaged in two types of industries and certified to be skilled in the types of industries. The digital badges prove skill certification in each of the types of industries in which the operator has been engaged.

In matching, the job matching unit 63 selects an optimal business place from a plurality of pieces of business-operator information and introduces the business operator to the operator based on a single digital badge or a combination of digital badges. For example, each business operator sets a condition of a digital badge corresponding to a necessary skill, a desired skill, a skill value for each skill, and the like. The job matching unit 63 selects a business operator (e.g., business operator most suitable for operator), who has set a condition of a digital badge held by an operator, from a plurality of business operators, and introduces the business operator as an optimal business operator for the operator holding a single digital badge or a plurality of digital badges. An operator can achieve work matching in a new form. For example, the operator can utilize a skill which he/she has achieved in metal grinding work also in a pharmaceutical manufacturing industry (site of manufacturing of cell pharmaceutical products) different from the metalworking industry. The operator can be engaged in an industry of a type which the operator has not found successfully.

Furthermore, the job matching unit 63 introduces an optimal operator among a plurality of operators to a business operator based on a single digital badge or a combination of digital badges. The job matching unit 63 selects an operator (e.g., operator having number of digital badges and skill value exceeding predetermined value) from a plurality of operators having a single digital badge or a plurality of digital badges, and introduces the operator to the business operator as an optimal operator. The business operator can reduce adoption mismatch, and can achieve utilization for training a successor. For example, the operator introduction system can be utilized for determining which operator is optimal to succeed to a skill of a skilled operator from the relation between held digital badges.

Note that, although the job matching unit 63 introduces an optimal operator to a business operator and introduces an optimal business operator to an operator, this is not a limitation. The job matching unit 63 may introduce an appropriate single business operator or a plurality of appropriate business operators to an operator, or may introduce an appropriate single operator or a plurality of appropriate operators to a business operator. The appropriate operator is, for example, an operator holding a single digital badge or a plurality of digital badges. The optimal operator has an operator who has the number of digital badges or a skill value exceeding a predetermined value among appropriate operators. The predetermined number is preset by, for example, a business operator or the like, but may be appropriately changed. The business operator can change a predetermined value by performing an input operation on the input unit 12 of a business-operator terminal 10, for example.

<1-2. Example of Grinding Work and Quality Evaluation Work>

Figure 2:
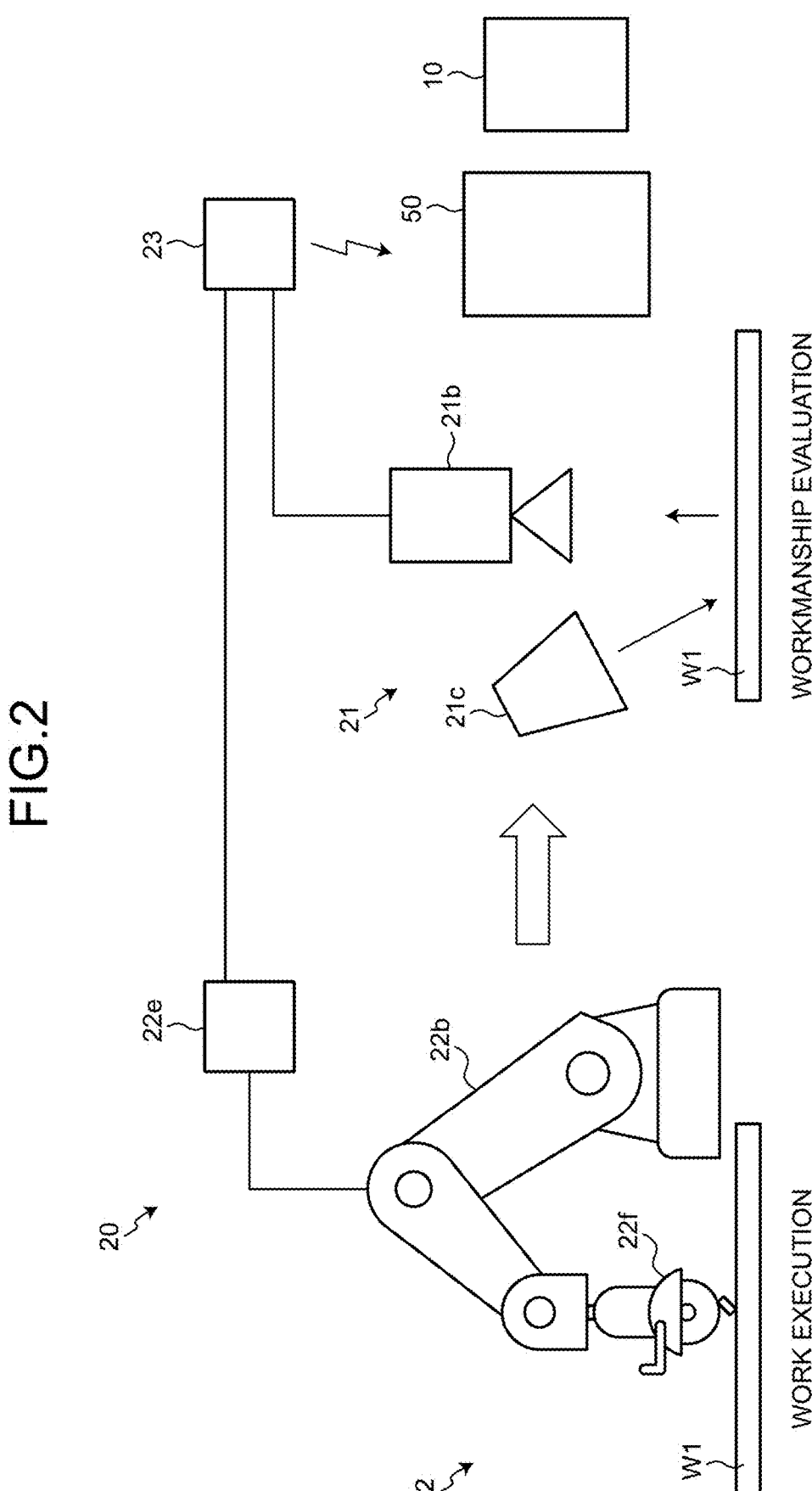
FIG. 2 is a view for describing an example of grinding work and quality evaluation work according to the embodiment of the present disclosure.
Figure 3:
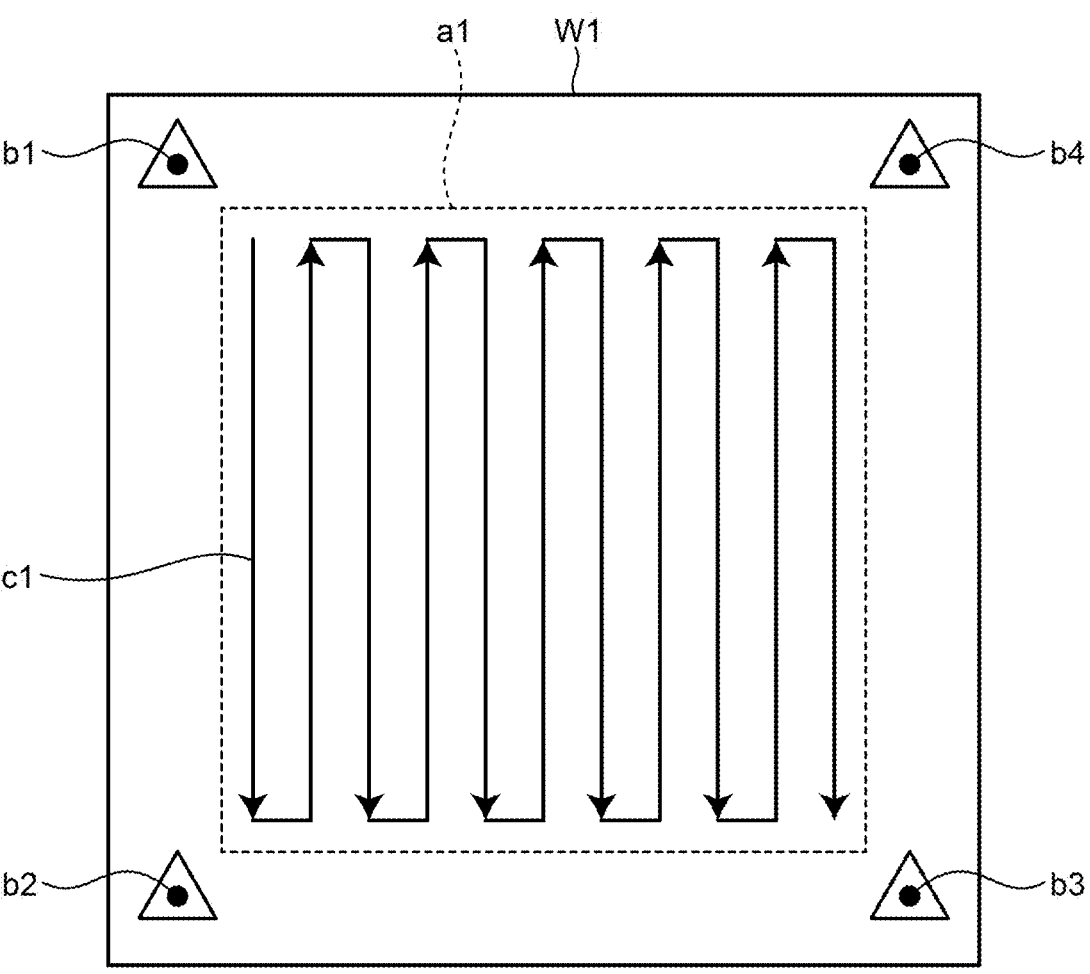
FIG. 3 is a view illustrating a surface to be ground of an object to be ground according to the embodiment of the present disclosure.

An example of the grinding work and the quality evaluation work according to the present embodiment will be described with reference to FIG. 2 and FIG. 3. FIG. 2 is a view for describing the example of the grinding work and the quality evaluation work according to the present embodiment. FIG. 3 is a view illustrating a surface to be ground of an object to be ground W1 according to the present embodiment.

As illustrated in FIG. 2, a robot device 22 is a robot for the grinding work. The robot device 22 performs the grinding work on the object to be ground W1 by using an arm manipulator 22b having a grinder 22f as an end effector (work execution). The arm manipulator 22b is controlled by a control unit 22e. The object to be ground W1 is ground and becomes a ground object (product) W1. Note that motion information related to the arm manipulator 22b including the grinder 22f is transmitted to a robot controller 23.

In addition, a situation monitoring device 21 emits light to the ground object (product) W1 by illumination 21c, and images a surface to be cut which surface is a surface of the product by the imaging unit 21b (workmanship evaluation=quality evaluation). Image information related to the surface to be cut of the product is transmitted to the robot controller 23.

Note that the imaging for the quality evaluation is performed by the situation monitoring device 21, but is not limited thereto. For example, imaging and information acquisition of a surface to be cut (evaluation surface) may be executed by a business operator inputting a captured image to a business operator-side terminal 10 and performing transmission thereof to a platform 50, or by transmission of an image captured by a camera attached to the robot device 22 to the platform 50.

The motion information and the image information are received by the robot controller 23 and transmitted from the business operator-side device 20 to the platform 50 via a network N by a communication unit 23a of the robot controller 23. Note that the motion information and the image information may be processed by a video processing unit 23b of the robot controller 23 as necessary, and then transmitted to the platform 50 by the communication unit 23a.

The platform 50 analyzes the motion information and the image information transmitted from the business operator-side device 20 by a work information analysis unit 52, a work evaluation unit 58, and the like. For example, the platform 50 analyzes the motion information and the image information, and performs data generation related to the grinding work and the quality evaluation work. At this time, the platform 50 may use a data analysis unit 53, a video analysis unit 55, and the like as necessary. Furthermore, the platform 50 may perform machine learning (such as deep learning) by a teaching material providing unit 57 and store a proficiency model in the teaching material providing unit 57. Furthermore, a learning unit that mainly executes machine learning and stores a proficiency model may be provided instead of the teaching material providing unit 57. Various kinds of processing such as the above-described data generation processing by analysis and machine learning will be described later in detail.

Note that the platform 50 may store various kinds of data in a storage unit such as a device log DB 54 or a video DB 56 as necessary. Any one or more or all of the units such as the work information analysis unit 52, the work evaluation unit 58, the data analysis unit 53, the video analysis unit 55, the teaching material providing unit 57, and the learning unit correspond to an information processing unit and execute various kinds of information processing. As the information processing unit, another component of the platform 50 can also be used.

In addition, the platform 50 transmits the image information from the platform 50 to the business operator-side terminal 10 via the network N. The business operator-side terminal 10 displays, by a display unit 11, the image information transmitted from the platform 50. For example, a requester, a supervisor, or the like on the business operator side operates the input unit 12 and sets a plurality of arbitrary regions in an image on the display unit 11.

Here, there are a case where the robot device 22 automatically performs work according to an execution plan (such as a robot control model 23d) programmed in advance, a case where the robot device 22 performs work by being operated by an operator on the business operator side, and a case where the robot device 22 performs work by being remotely operated by a remote operator.

The robot device 22 changes a position of the arm manipulator 22b in x, y, and z coordinates (spatial coordinates defined by three axes) in such a manner that the grinder 22f can execute the grinding work on a necessary portion of the object to be ground W1 during execution of the work, and controls pressure applied to the object to be ground W1 in such a manner that a necessary amount of grinding can be performed.

As illustrated in FIG. 3, a target area a1 of the grinding work and reference points b1 to b4 exist on the surface of the object to be ground W1. The reference points b1 to b4 may be artificially given markers or feature points that the object to be ground has from the beginning, but are required to be unchanged before and after work. Although the number of reference points is four in the example of FIG. 3, the number is not limited thereto and may be three, for example.

Before the start of the grinding work, the arm manipulator 22b is controlled by the control unit 22e in such a manner that the grinder 22f comes into contact with the reference points b1 to b4, and data of position coordinates thereof is temporarily recorded as $b1r(x, y, z)$, $b2r(x, y, z)$, $b3r(x, y, z)$, and $b4r(x, y, z)$, for example, in a storage region (storage unit) of the control unit 22e. These pieces of information are calibration data of the position coordinates of a robot motion.

During the work, the arm manipulator 22b is controlled by the control unit 22e in such a manner that the grinder 22f moves like a trajectory c1 illustrated in FIG. 3, that is, a position of the grinder 22f is changed. At this time, x, y, and z coordinate values of the grinder 22f, a pressure value applied to the object to be ground W1, and a time stamp value are collected and recorded by the control unit 22e as needed. Then, the object to be ground (product) W1 on which object the work has been completed is photographed at an angle of view including the reference points b1 to b4 by a combination of the illumination 21c and the imaging unit 21b corresponding to a photographing purpose, and image information (bird's-eye image data) for quality evaluation is obtained.

<1-3. Example of Data Generation Processing Related to the Grinding Work and the Quality Evaluation Work>

Figure 4:
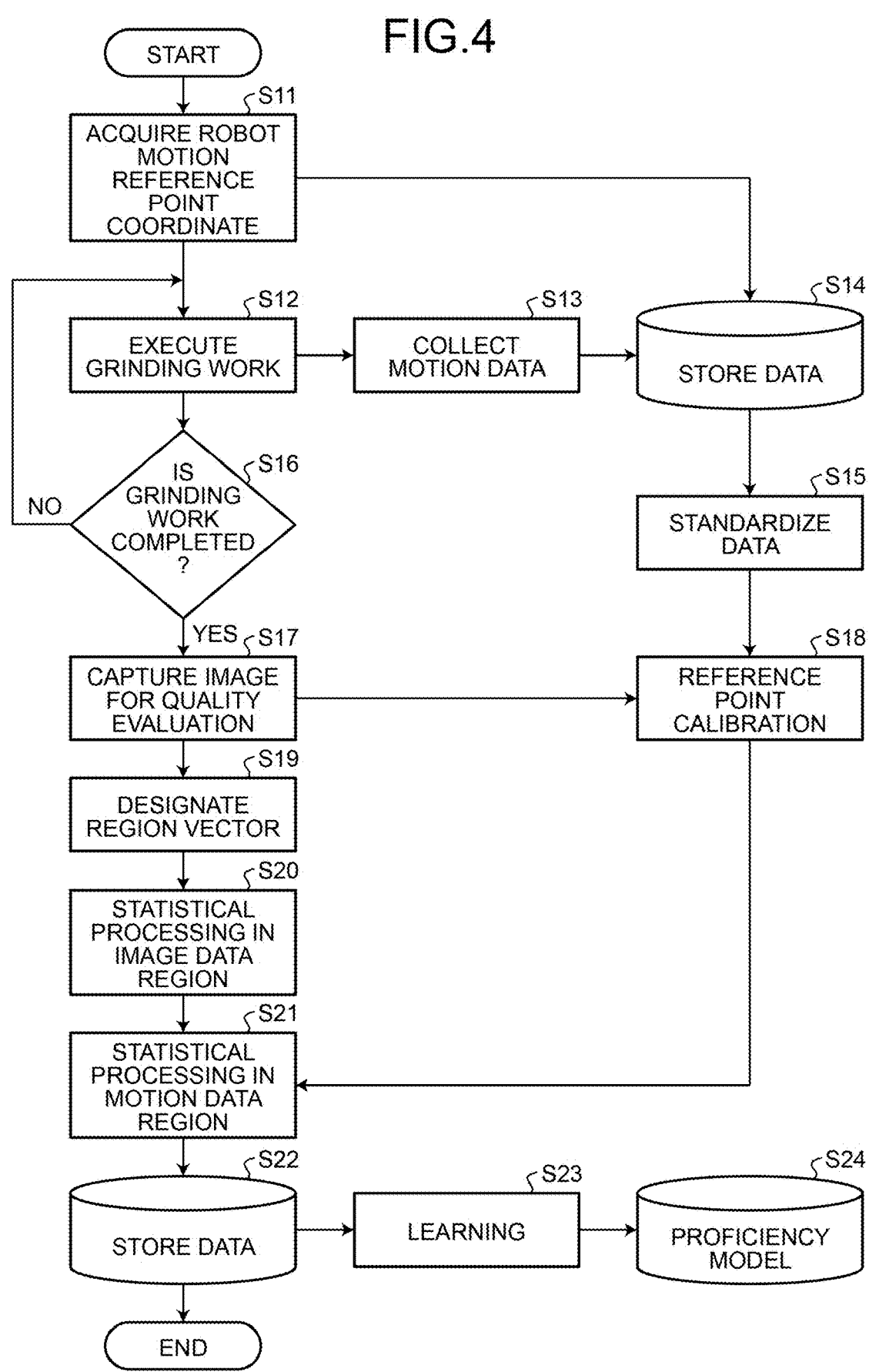
FIG. 4 is a flowchart illustrating an example of a flow of data generation related to the grinding work and the quality evaluation work according to the embodiment of the present disclosure.
Figure 5:
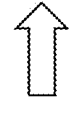
FIG. 5 is a view illustrating an example of an evaluation image and attribute data of a surface to be cut of the object to be ground according to the embodiment of the present disclosure.
Figure 5:
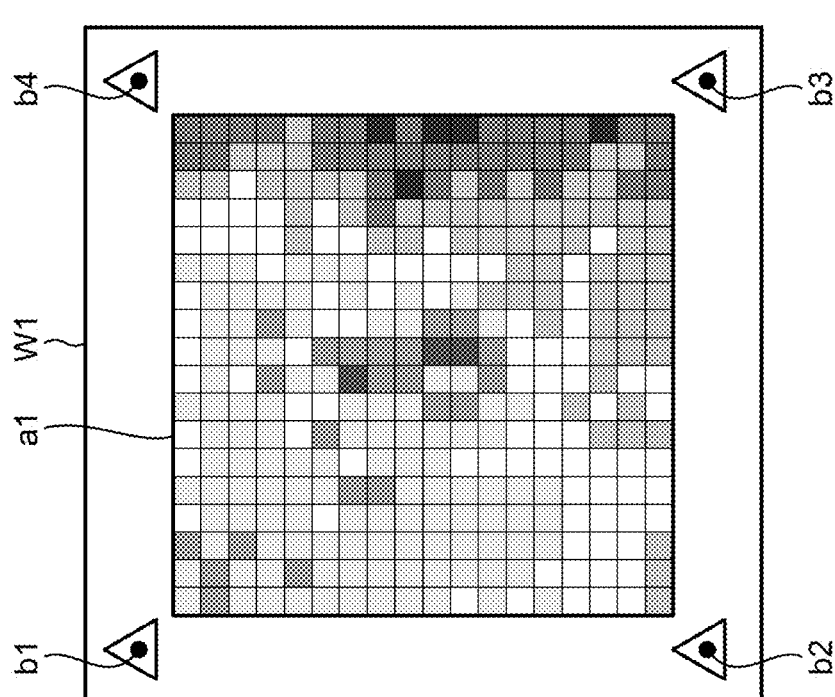
Figure 6:
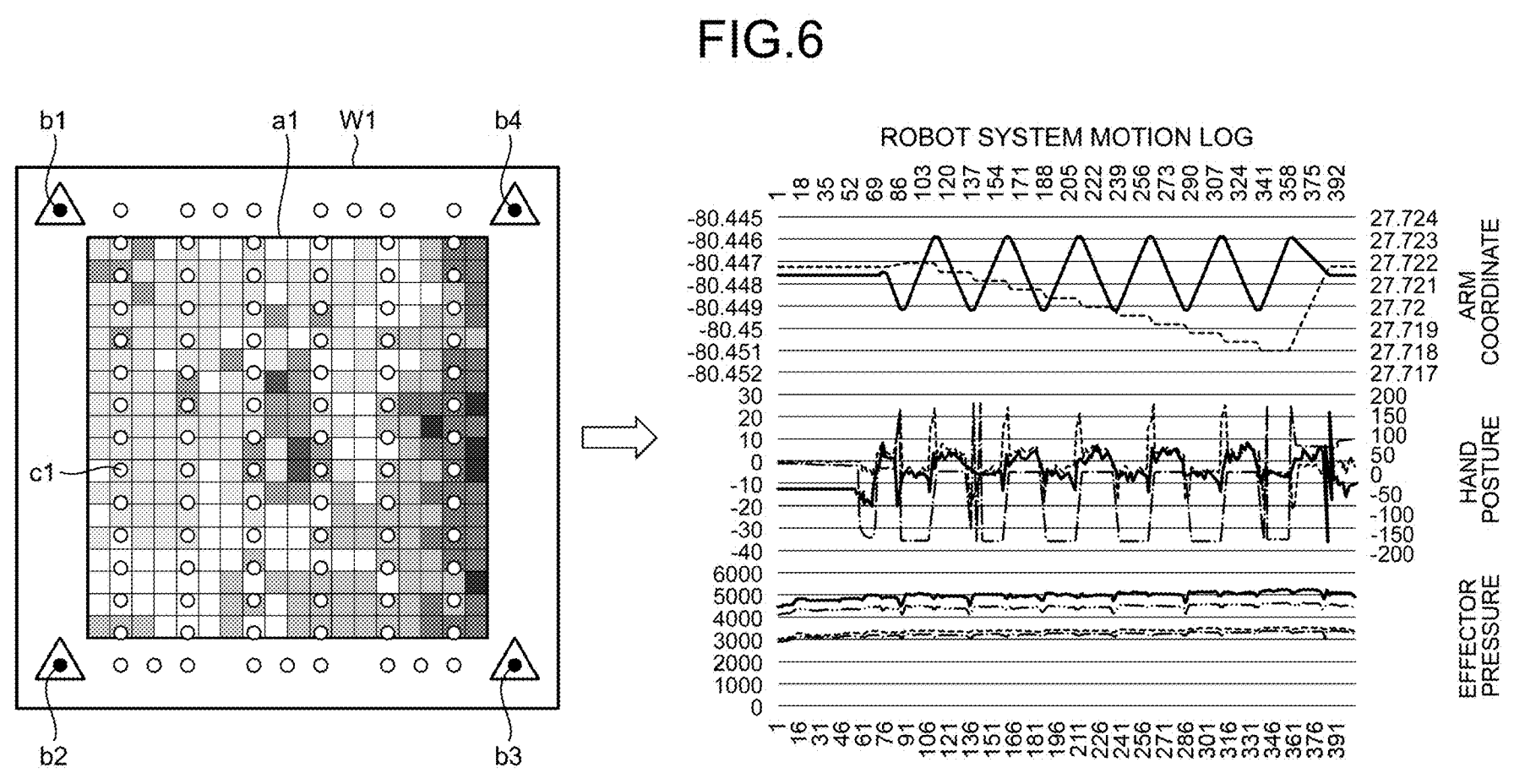

An example of the data generation processing related to the grinding work and the quality evaluation work according to the present embodiment will be described with reference to FIG. 4 to FIG. 6. FIG. 4 is a flowchart illustrating an example of a flow of the data generation related to the grinding work and the quality evaluation work according to the present embodiment. FIG. 5 is a view illustrating an example of an evaluation image and attribute data of a surface to be cut of the object to be ground W1 according to the present embodiment. FIG. 6 is a view illustrating an example of the evaluation image of the surface to be cut of the object to be ground W1, a motion trajectory of the robot device 22, and work statistical data according to the present embodiment.

As illustrated in FIG. 4, in Step S11, the control unit 22e of the robot device 22 acquires the coordinates of the reference points of the robot motion. In Step S12, the control unit 22e of the robot device 22 controls the arm manipulator 22b and executes the grinding work by the grinder 22f.

In Step S13, the platform 50 collects motion data of the robot device 22 from the robot device 22. In Step S14, the platform 50 stores the motion data and reference point data related to the coordinates of the reference points. In Step S15, the platform 50 standardizes the data.

In Step S16, the control unit 22e of the robot device 22 determines whether the grinding work is completed, and repeats the grinding work of Step S12 until the grinding work is completed. In Step S17, the imaging unit 21b of the situation monitoring device 21 captures an image for quality evaluation.

In Step S18, the platform 50 executes calibration of the reference points. In Step S19, the platform 50 designates a region vector according to, for example, input information (region setting information) from the business operator-side terminal 10. In Step S20, the platform 50 executes statistical processing (characteristic statistical processing) in a region of the image data. In Step S21, the platform 50 executes statistical processing (work statistical processing) in a region of the motion data.

In Step S22, the platform 50 stores various kinds of data of characteristic statistical data and work statistical data of each region. In Step S23, the platform 50 performs machine learning on the basis of the stored data. In Step S24, the platform 50 stores the proficiency model generated by machine learning.

In such a flow, specifically, in Step S18 described above, in order to match positional information of the characteristic statistical data of each region of the image data and that of the work statistical data (motion history information) of the grinder 22f in each region, coordinate transformation of the motion history information (such as locus data) of the grinder 22f is performed in such a manner that reference point addresses $b1i(x, y, z)$, $b2i(x, y, z)$, $b3i(x, y, z)$, and $b4i(x, y, z)$ on the image data match the calibration data $b1r(x, y, z)$, $b2r(x, y, z)$, $b3r(x, y, z)$, and $b4r(x, y, z)$ of the position information of the robot motion which calibration data is acquired previously. As a result, motion history information related to the coordinate-transformed motion trajectory of the robot device 22 is obtained.

In addition, in Step S19 described above, the image for evaluation is displayed by the display unit 11 of the business operator-side terminal 10. An evaluator such as a requester, a supervisor, or the like on the business operator side operates the input unit 12 and sets a plurality of arbitrary regions ($18 \times 18 = 324$ grids in the example of FIG. 5) in the image on the display unit 11 as illustrated in FIG. 5. Note that the evaluator may be other than the business operator, and the region setting may be executed by another terminal.

In addition, for each region (block) of the image data, the characteristic statistical data in the region is obtained in Step S20 described above. Specifically, characteristic statistical data of an image characteristic value in each region is obtained, and these pieces of characteristic statistical data are stored as attribute data of the region vector together with image coordinate information of each region. For example, as illustrated in FIG. 5, an average value, a standard deviation, a minimum value, and a maximum value of the pixel characteristic value (such as luminance, a pixel value, or the like) are obtained as the characteristic statistical data for each region ID (see a table that is a right view in FIG. 5). Note that in the example of FIG. 5, an evaluation image is illustrated (see a left view in FIG. 5), and a degree of quality such as cutting unevenness in the evaluation image is indicated by several types of colors and shades in units of regions (in units of blocks).

In addition, in Step S21 described above, the motion trajectory of the robot device 22 is superimposed and displayed as vector data on the evaluation image as illustrated in FIG. 6 (see a left view in FIG. 6). Furthermore, the work statistical data of the grinder 22f in each region is stored as attribute data of the same vector data. For example, in the example of FIG. 5, the work statistical data is stored in association with the region ID in the table that is the right view in FIG. 5.

As illustrated in FIG. 6, the work statistical data includes the motion history information of the robot device 22 (see a right view in FIG. 6). Note that coordinates of the arm manipulator 22b of the robot device 22, a posture (such as an angle, coordinates, or the like) of the grinder 22f that is an example of the end effector of the robot device 22, the pressure value applied to the object to be ground W1, and the time stamp value are sequentially acquired. For example, these pieces of information are obtained by various sensors 22c of the robot device 22.

The motion history information includes coordinate history information related to a history of spatial coordinates of the arm manipulator 22b (spatial coordinates of the grinder 22f), posture history information related to a posture history of the grinder 22f, and pressure history information related to a pressure history of the grinder 22f. Both the coordinate history information and the posture history information are information included in trajectory history information related to a trajectory history of the grinder 22f.

Note that the motion history information includes all of the coordinate history information, the posture history information, and the pressure history information, but is not limited thereto. For example, any one or two of the coordinate history information, the posture history information, and the pressure history information may be included. The motion history information includes at least any or all of coordinate history information, posture history information, and pressure history information of a manipulator including the grinder 22f, the arm manipulator 22b, or the like.

According to such a series of processing, for example, an image characteristic value (characteristic statistical data) as a quality evaluation index in a region having a good grinding work quality can be statistically associated with the motion data (work statistical data) of the grinder 22f that is a factor of the quality. Similarly, an image characteristic value in a region with poor quality can be statistically associated with the motion data of the grinder 22f.

In Step S23, by learning combination data of factors (motion history) and quality results of a fine product sample and a defective product sample which combination data is obtained in the above manner, for example, by using the teaching material providing unit 57, the platform 50 can obtain a motion profile (proficiency model) of the grinder 22f from which model a good grinding result can be obtained. By reflecting this proficiency model in an autonomous control program (such as the robot control model 23d) of the robot device 22, it becomes possible to obtain stable automatic grinding work quality. In addition, utilization as training data for making work of an operator proficient is also possible.

As described above, correlation between the motion history information of the robot device 22 which information is collected at the time of execution of the work and quality evaluation information extracted from the image data of a surface to be worked such as the surface to be cut is obtained, and it becomes possible to analyze the correlation. For example, correlation related to the quality evaluation information (image inspection data), the coordinate history information of the robot device 22, and the posture history information of the end effector of the robot device 22 is analyzed. Note that as an imaging method and an image processing method used for the quality evaluation, various methods can be applied according to required quality required for each kind of performed work.

<1-4. Specific Example of an Evaluation Method of a Surface to be Cut>

Figures 7, 8:
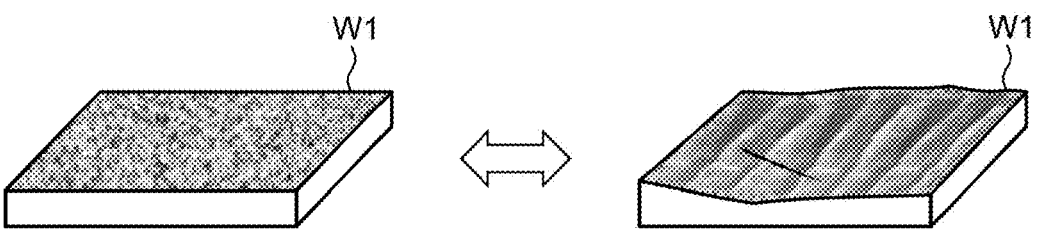
FIG. 7 is a view for describing good grinding quality and poor grinding quality on the surface to be ground of the object to be ground according to the embodiment of the present disclosure.
FIG. 8 is a view for describing 3D measurement using a stereo camera according to the embodiment of the present disclosure.

A specific example of an evaluation method of the surface to be cut according to the present embodiment will be described with reference to FIG. 7 to FIG. 12. Since a viewpoint of the quality evaluation varies depending on a purpose of work, some representative examples will be described. FIG. 7 is a view for describing good grinding quality and poor grinding quality in the surface to be ground of the object to be ground W1 according to the present embodiment. The surface to be cut in FIG. 7 is an enlarged view of a part of the surface to be ground on which surface cutting work is performed.

As illustrated in FIG. 7, a left view in FIG. 7 is a surface to be ground having good grinding quality, and a right view in FIG. 7 is a surface to be ground having poor grinding quality. Representative characteristic items that distinguish the grinding quality of the surface to be ground include a degree of matching between a thickness of the surface to be ground and a target thickness (grinding amount), homogeneity/flatness, unevenness/scratch, and the like.

With respect to the degree of matching between the thickness of the surface to be ground and the target thickness, it is possible to measure whether the target grinding amount is achieved by measuring how much a height of the work surface is changed before the grinding work and after the grinding work with any one of the reference points b1 to b4 in FIG. 3 or an average value thereof being used as a reference point in the z coordinate.

(Representative Example of an Optical Method of Measuring Height)

Figure 9:
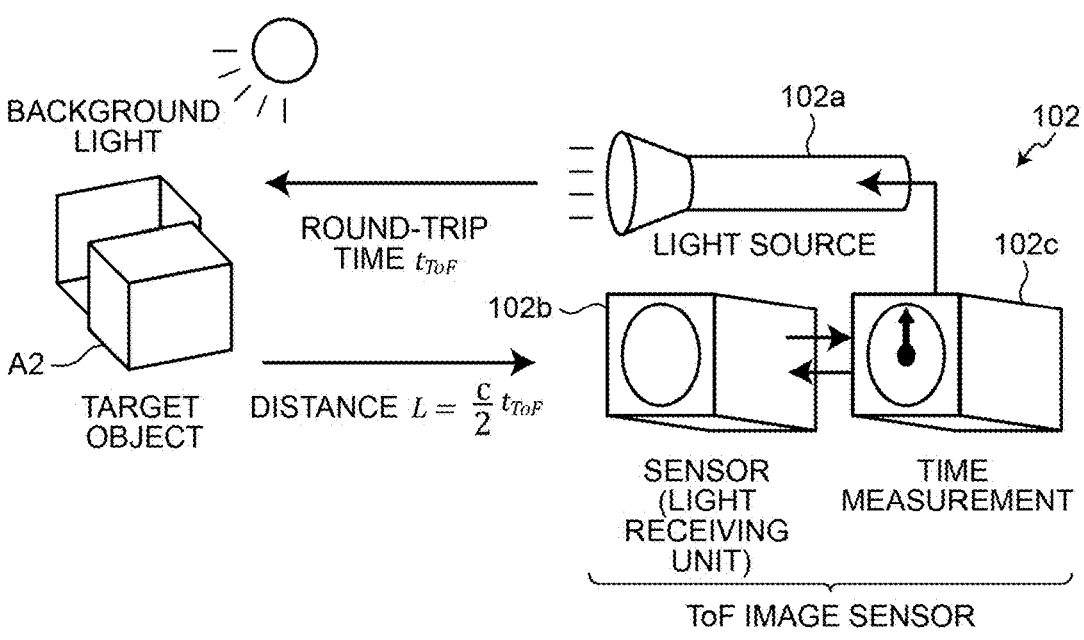
FIG. 9 is a view for describing 3D measurement using a time of flight (ToF) sensor according to the embodiment of the present disclosure.
Figure 10:
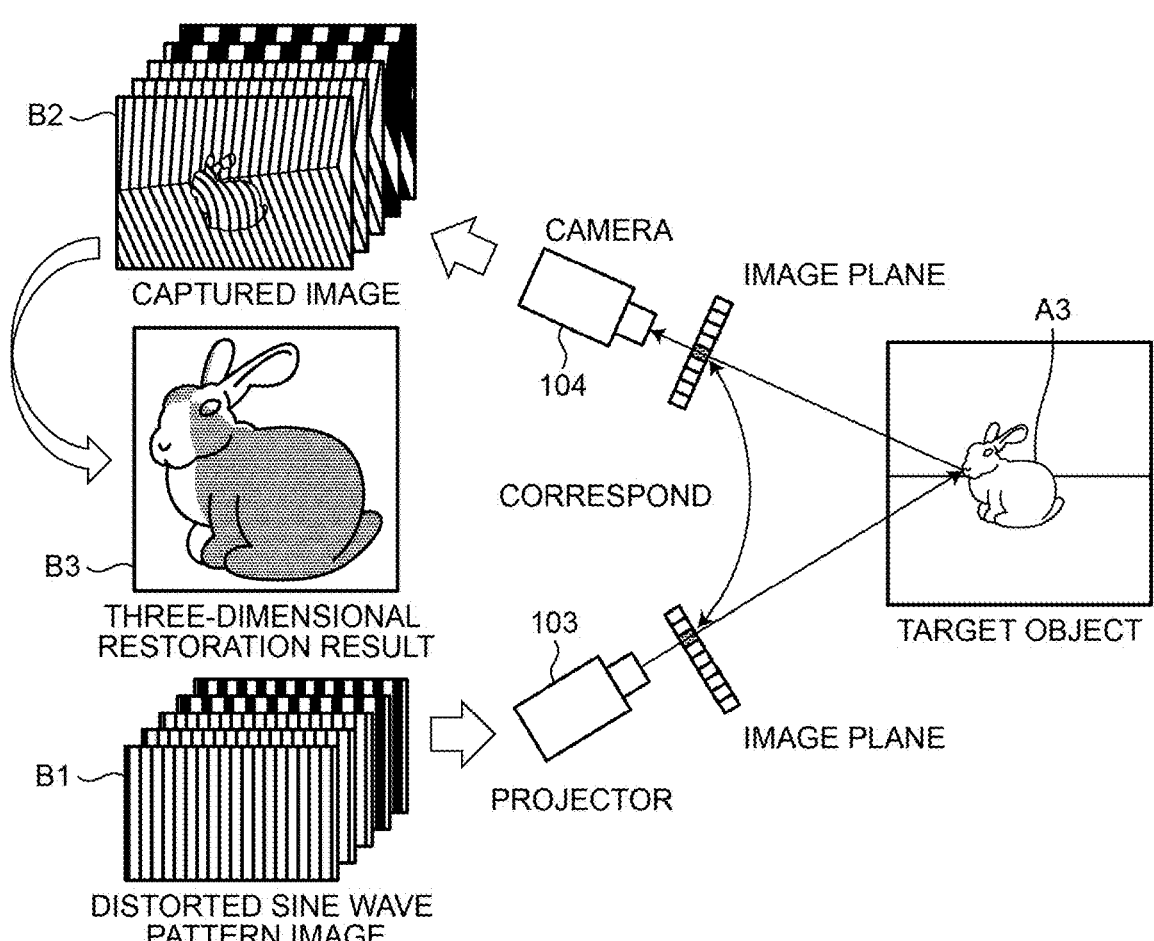
FIG. 10 is a view for describing 3D measurement using a projector and a monocular camera according to the embodiment of the present disclosure.

A representative example of the optical method of measuring the height will be described with reference to FIG. 8 to FIG. 10. FIG. 8 is a view for describing 3D measurement using a stereo camera 101 according to the present embodiment. FIG. 9 is a view for describing 3D measurement using a time of flight (ToF) sensor 102 according to the present embodiment. FIG. 10 is a view for describing 3D measurement using a projector 103 and a monocular camera 104 according to the present embodiment.

As illustrated in FIG. 8, 3D measurement is performed by the stereo camera 101. In the example of FIG. 8, the stereo camera 101 photographs an object A1 with left and right cameras 101a and 101b, calculates a pixel shift between two images, and calculates parallax D on the basis of the pixel shift. Then, the stereo camera 101 calculates a distance Z from each lens 101c to the object A1 on the basis of the parallax D, a distance B between the two cameras 101a and 101b, and a focal length F, and grasps depth information of an entire screen on the basis of the distance Z. Note that a relational expression of $Z=(B{\times}F)/D$ holds.

As illustrated in FIG. 9, 3D measurement is performed by the ToF sensor (ToF image sensor) 102. In the example of FIG. 9, the ToF sensor 102 measures a distance L to a target object A2 by measuring, with a measuring unit 102c, time until light emitted from a light source 102a is reflected by the target object A2 and returned to a sensor (light receiving unit) 102b. Note that when a speed of the light is c and round-trip time that is flight time of the light is $t_{ToF}$, a relational expression of the distance $L=(c{\times}t_{ToF})/2$ holds.

As illustrated in FIG. 10, structured light emitted from the projector 103 is captured by the monocular camera 104, whereby 3D measurement is performed. In a structured light method, a stripe or lattice pattern (such as a distorted sine wave pattern image B1) is projected on a target object A3 by the projector 103, and is captured by the camera 104 at another angle. Since the projected pattern (such as a captured image B2) is distorted by a shape of the target object A3, the shape and depth information (such as a three-dimensional restoration result B3) of the target object A3 are obtained from the distortion.

These various optical methods can be appropriately used from a viewpoint of a scale, cost, and measurement accuracy of the system. In any of these methods, a height distribution of the entire work surface can be regarded as a two-dimensional distribution of the x and y coordinates. In addition, it is possible to evaluate how much the average height in the surface to be ground having good grinding quality or poor grinding quality matches the target thickness, and it also is possible to evaluate homogeneity and flatness by statistical analysis such as a maximum value, a minimum value, and a standard deviation of the height in each surface. For example, it is evaluated the surface is the good surface to be ground in a case where a difference (dynamic range) between the maximum value and the minimum value of the height of each region of the surface to be ground is smaller than a predetermined reference value (such as a standard value) and the standard deviation is smaller than a predetermined reference value (such as a standard value), and it is determined that the surface is the poor surface to be ground in a case where the dynamic range is larger than the predetermined reference value or the standard deviation is larger than the predetermined reference value. The predetermined reference values are set in advance.

(Representative Example of an Optical Method of Capturing Unevenness and Scratches)

Figure 11:
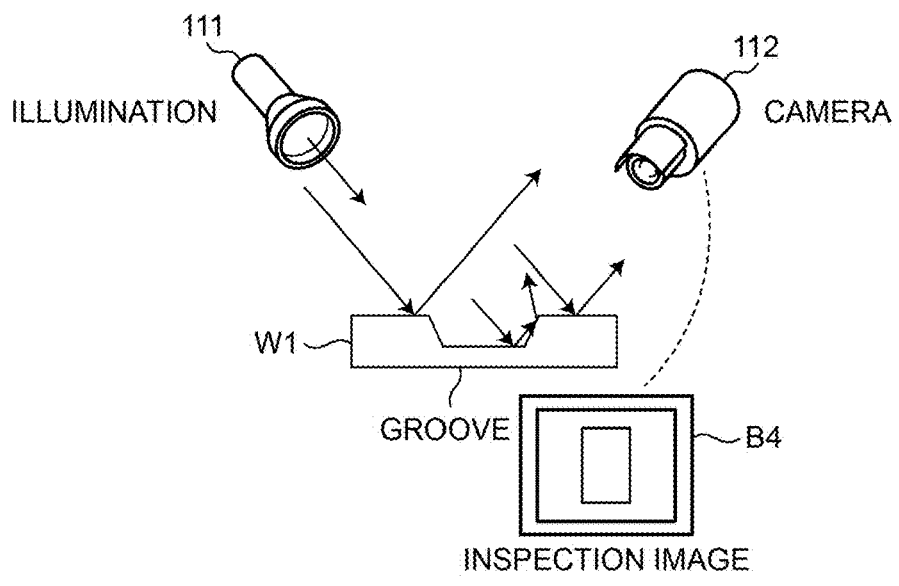
FIG. 11 is a view for describing unevenness and scratch detection using bright field illumination according to the embodiment of the present disclosure.
Figure 12:
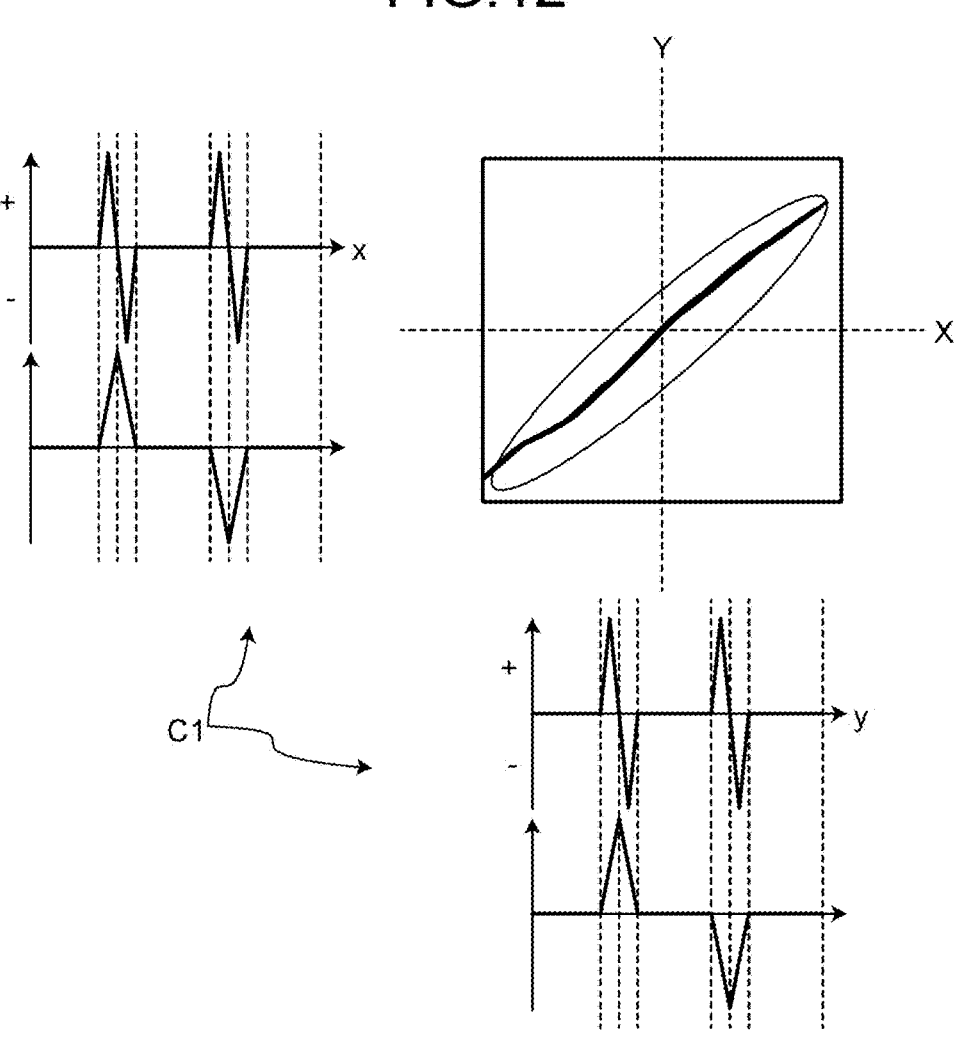
FIG. 12 is a view for describing an example of extraction of a scratch by a filter according to the embodiment of the present disclosure.

A representative example of an optical method of capturing unevenness and scratches will be described with reference to FIG. 11 and FIG. 12. FIG. 11 is a view for describing unevenness and scratch detection using bright field illumination according to the present embodiment. FIG. 12 is a view for describing an example of extraction of a scratch by a filter according to the present embodiment.

As illustrated in FIG. 11, light is emitted to the surface to be ground of the object to be ground W1 by illumination 111, and the surface to be ground is imaged by a camera 112. As a result, an inspection image B4 is obtained. As illustrated in FIG. 12, a Laplacian filter C1 is applied to two-dimensional imaging data of the inspection image B4 in an x and y space, and a scratch is extracted, for example. Here, a change in a surface shape having a high local frequency component appears as unevenness or a scratch. By using a photographing method using the bright field illumination, it is possible to more remarkably capture the unevenness or the scratch and a change in a specular reflection component in the vicinity thereof.

<1-5. Specific Example of an Evaluation Method of a Surface to be Coated>

Figure 13:
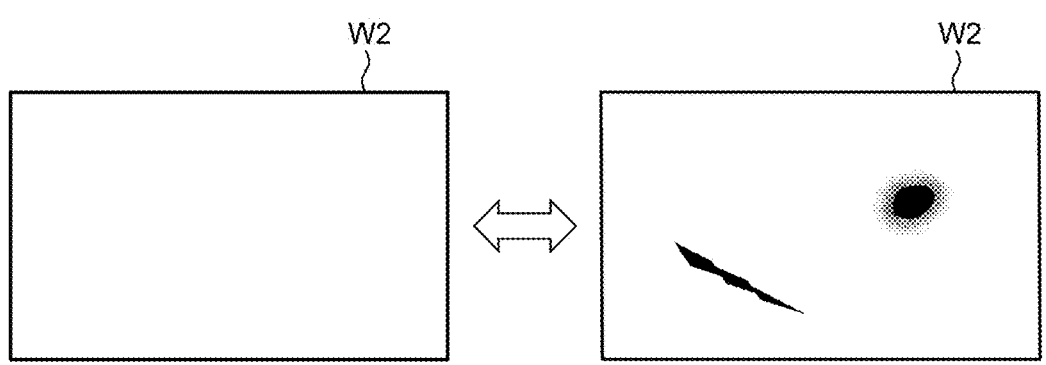
FIG. 13 is a view for describing good coating quality and poor coating quality on a surface to be coated of an object to be coated according to the embodiment of the present disclosure.

A specific example of the evaluation method of the surface to be coated according to the present embodiment will be described with reference to FIG. 13 to FIG. 16. Since a viewpoint of the quality evaluation varies depending on a purpose of work, some representative examples will be described. FIG. 13 is a view for describing good coating quality and poor coating quality on a surface to be coated (coated surface) of an object to be coated W2 according to the present embodiment. The surface to be coated in FIG. 13 is an enlarged view of a part of a three-dimensional curved surface on which coating work is performed.

As illustrated in FIG. 13, a left view in FIG. 13 is a surface to be coated having good coating quality, and a right view in FIG. 13 is a surface to be coated having poor coating quality. Representative characteristic items that distinguish the coating quality of the surface to be coated include a degree of matching between chromaticity of the surface to be coated and target chromaticity, color unevenness, stain, dust, and scratches. As a method of evaluating the degree of matching between the chromaticity of the surface to be coated and the target chromaticity, chromaticity evaluation using an RGB camera is common. Spectral analysis using a multispectral camera is considered as a more precise measurement method.

(Representative Example of a Method of Measuring Chromaticity of a Coated Surface)

Figure 14:
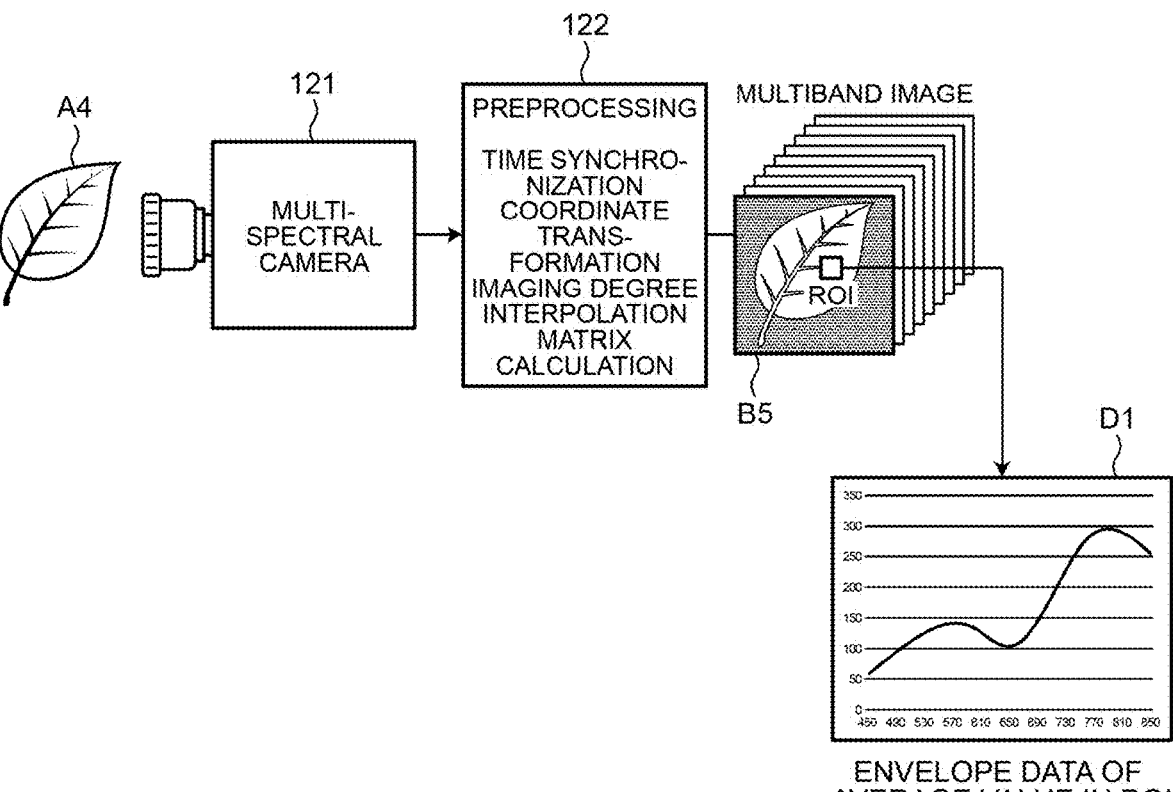
FIG. 14 is a view for describing a multispectral camera system according to the embodiment of the present disclosure.

A representative example of a measurement method of the chromaticity of the surface to be coated will be described with reference to FIG. 14. FIG. 14 is a view for describing a multispectral camera system according to the present embodiment.

Although a normal RGB camera can handle three types of multiband images, a multispectral camera 121 can image an object A4 and handle tens to hundreds of types of multiband images B5 as illustrated in FIG. 14. Note that preprocessing on an image is executed by the processing unit 122. As the preprocessing, for example, time synchronization, coordinate transformation, imaging degree interpolation, matrix calculation, and the like are performed. Furthermore, although the chromaticity can only be expressed by a ratio of three colors of R/G/B in the RGB camera, chromaticity can be expressed by an envelope in which wavelength axes are continuously connected as illustrated in FIG. 14 (for example, see envelope data D1 of an average value in a region of interest (ROI) in FIG. 14) in the multispectral camera 121. This makes it possible to identify a more subtle difference in hue. In addition, a chromaticity distribution of the entire surface to be coated can be grasped as a two-dimensional distribution in the x and y coordinates, and it is possible to evaluate how much average hue in the surface to be coated with good coating quality or poor coating quality matches the target chromaticity, and it is possible to quantitatively evaluate the color unevenness by statistically analyzing variation in chromaticity in each surface.

(Representative Example of a Method of Evaluating Stain, Dust, and Scratches)

Figure 15:
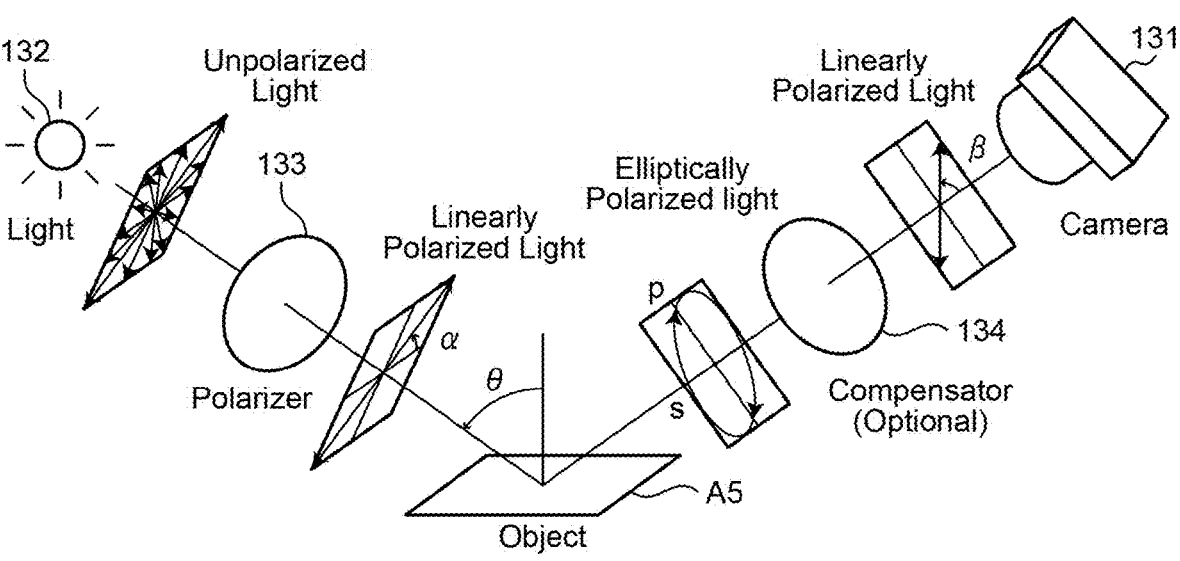
FIG. 15 is a view for describing a scratch detection system using a polarization camera according to the embodiment of the present disclosure.
Figure 16:
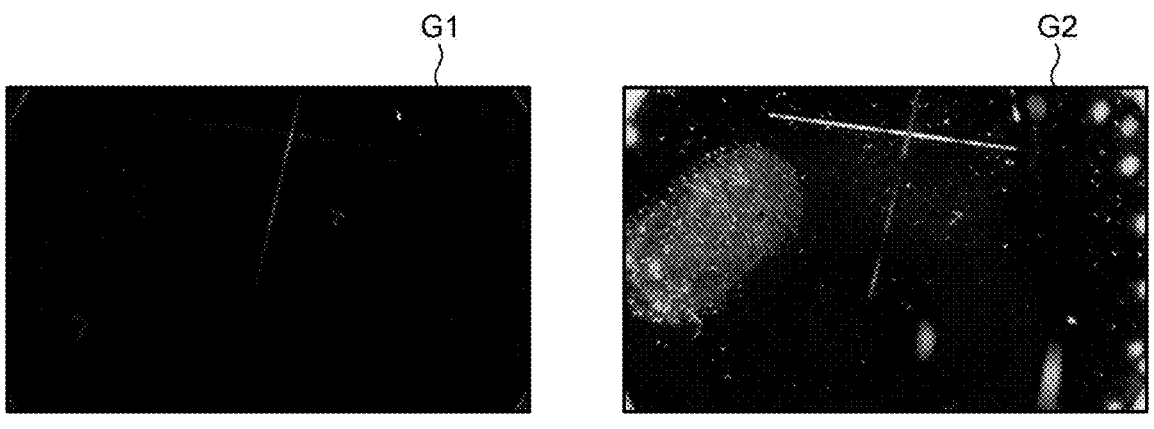
FIG. 16 is a view illustrating an example of a stain/dust/scratch detection image by the polarization camera according to the embodiment of the present disclosure.

A representative example of the method of evaluating stain, dust, and scratches will be described with reference to FIG. 15 and FIG. 16. FIG. 15 is a view for describing a scratch detection system using a polarization camera 131 according to the present embodiment. FIG. 16 is a view illustrating an example of a stain/dust/scratch detection image by the polarization camera 131 according to the present embodiment.

As illustrated in FIG. 15, the scratch detection system is an optical method using a polarization technology such as the polarization camera 131. It is known that a degree of polarization of light emitted from a light source 132 and reflected on a surface of an object A5 that is an object to be coated varies depending on a surface state such as a material, color, and unevenness of the object, an angle of the reflection, and the like. Note that a polarizing plate 133 and a compensation plate 134 are provided on an optical path from the light source 132 to the polarization camera 131 via the object A5. As illustrated in FIG. 16, among images obtained by the polarization camera 131, an image G1 in which stain, dust, scratches, and the like are not detected and an image G2 in which these are detected are illustrated. In the image G2 in FIG. 16, since there is a difference from the surroundings in a polarization degree in a portion of a scratch and stain (fingerprint and dust), the portion is emphasized.

Each of the above-described evaluation methods of the surface to be worked such as the surface to be ground or the surface to be coated handles brightness/darkness information of each image. For example, by performing filtering processing of statistical processing in the entire work surface or a region of interest (ROI) of the work surface, it is possible to perform quantitative evaluation with quality corresponding to a type of target work as an appropriate index.

<1-6. Configuration Example of a Work Evaluation Model Generation System>

Figure 17:
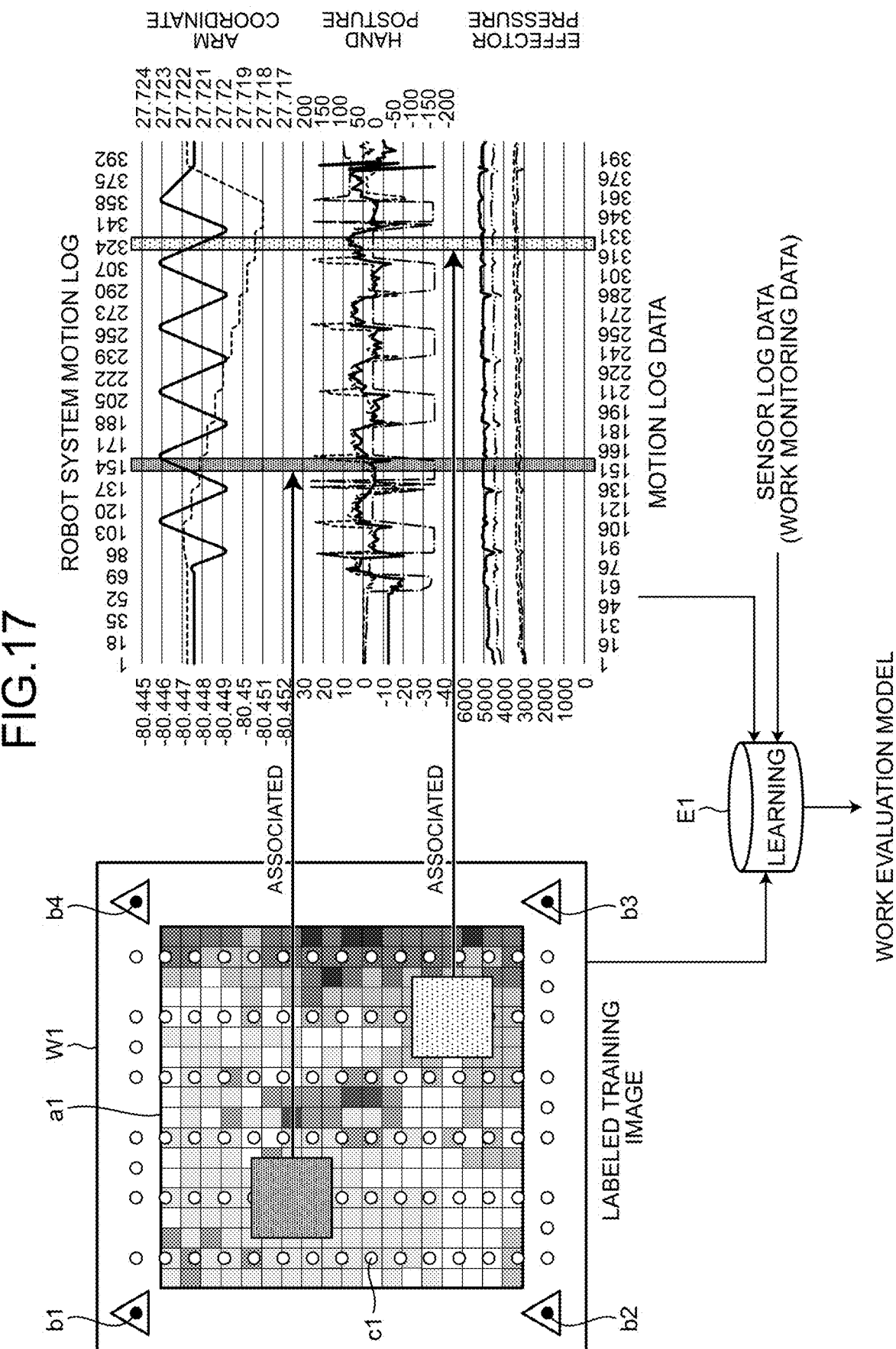
FIG. 17 is a view illustrating an example of a schematic configuration of a work evaluation model generation system according to the embodiment of the present disclosure.

A configuration example of the work evaluation model generation system according to the present embodiment will be described with reference to FIG. 17. FIG. 17 is a view illustrating an example of a schematic configuration of the work evaluation model generation system according to the present embodiment. Here, as a modification example of the present embodiment, an example of performing skill evaluation of an operator (worker) from operation data of the operator in grinding work by remote operation of a robot device 22 will be described.

As illustrated in FIG. 17, the work evaluation model generation system is a system in which a data set in which an image characteristic value as a workmanship evaluation index in a good quality region and a poor quality region included in quality evaluation information and motion history information (motion log data) of a grinder 22*f* that is a factor of the quality are associated with each other is set as learning data E1. The motion history information includes pieces of motion history information respectively associated with good quality region information and poor quality region information included in the quality evaluation information. The good quality region information is region information of first quality (such as desired quality), and the poor quality region information is region information of second quality lower than the first quality.

In the example of FIG. 17, a labeled training image (information such as a good quality region and a poor quality region), motion log data, sensor log data (work monitoring data), and the like are input as the learning data E1 for machine learning. Then, a work evaluation model is generated and output by machine learning. In the monitoring, a state of the robot device 22 that performs the work is monitored (observed and recorded). Note that although not being essential, the sensor log data is preferably used as the learning data E1 in order to improve reliability of the work evaluation model.

For example, a platform 50 can obtain a motion profile (proficiency model) of a grinder 22*f*, with which profile a good grinding result can be stably obtained, by learning combination data of a factor (motion history) and a result (quality) of a fine product sample and a defective product sample by using a teaching material providing unit 57. By reflecting this proficiency model in an autonomous control program (such as a robot control model 23*d*) of the robot, it becomes possible to obtain stable automatic grinding work quality.

Note that work other than cutting can be performed as the work by the remote operation of the robot device 22. In the work other than the cutting, when the work can be quantitatively evaluated, for example, quality equal to or higher than predetermined quality can be determined to be good, or quality closer to training data can be determined to be good.

<1-7. Configuration Example of a Work Intention Interpretation Model Generation System>

Figure 18:
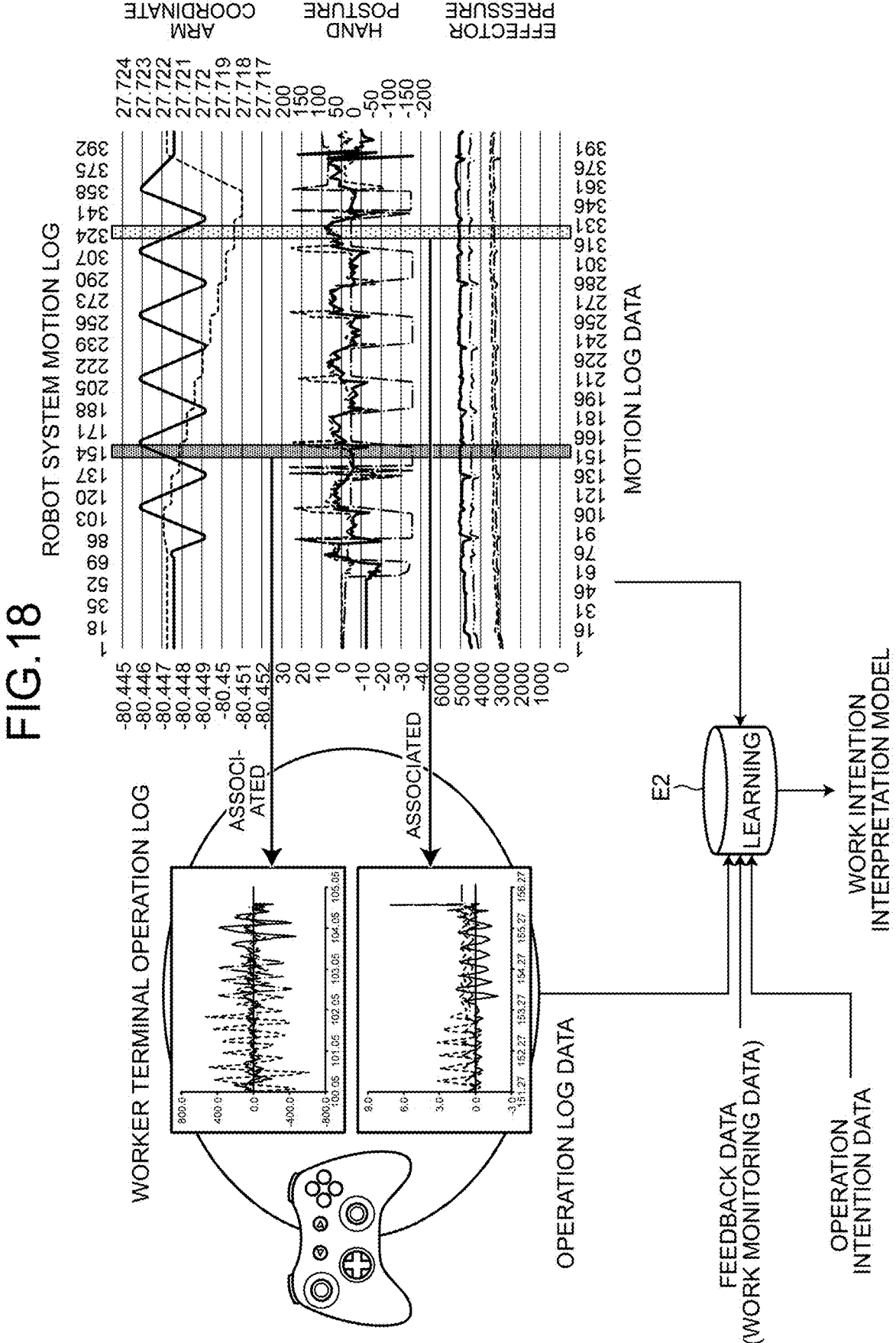
FIG. 18 is a view illustrating an example of a schematic configuration of a work intention interpretation model generation system according to the embodiment of the present disclosure.

A configuration example of the work intention interpretation model generation system according to the present embodiment will be described with reference to FIG. 18. FIG. 18 is a view illustrating an example of a schematic configuration of the work intention interpretation model generation system according to the present embodiment.

As illustrated in FIG. 18, the work intention interpretation model generation system is a system in which a data set in which motion history information (motion log data) of the grinder 22*f*, operation history information (operation log data) of an operator (worker) who remotely operates the robot device 22, feedback information (feedback data) to the operator, and operation intention information (operation intention data) related to operation intention of the operator are associated with each other is set as learning data E2. The motion history information includes, for example, pieces of motion history information respectively associated with the good quality region information and the poor quality region information included in the quality evaluation information. Furthermore, for example, in a case where the work is cutting work, the operation intention information includes information related to intention of the operator for the work, such as rough cutting and dense cutting.

In the example of FIG. 18, the motion log data, the operation log data, the feedback data (work monitoring data), the operation intention data based on an operation intention input, and the like are input as the learning data E2 for machine learning. Then, a work intention interpretation model is generated and output by machine learning. Note that although not being essential, the feedback data is preferably used as the learning data E2 in order to improve reliability of the work intention interpretation model.

Here, in a case where the worker explicitly inputs the operation intention information, the operation intention information also includes estimation information from sensor data for monitoring behavior and emotion of the worker. In an initial stage of learning, it is expected that a learning speed in interpretation of intention is accelerated by an explicit input by the worker. As the learning progresses, estimation accuracy of the intention of the worker is improved from the operation data of the worker, the operation data being, for example, information such as a speed and force of moving a controller, a length of time in which pushing is kept performed, and other sensor information. Furthermore, by repeating the learning with the data set associated with the motion history of the grinder 22*f*, it is possible to utilize the proficiency model obtained in FIG. 17 as training data for proficiency of the skill of the worker. Note that the controller is an example of an operation reception device 42*d* (see FIG. 1).

It is possible to generate an operation profile (skill model) of the operator, which profile is a factor of good quality, by accumulating the above-described learning related to work evaluation and work intention interpretation (see FIG. 17 and FIG. 18), and it is possible to evaluate the skill of the operator by analyzing work quality and operation data of the operator.

Here, a conventional technique that is not the present embodiment merely evaluates quality of a work product, and does not specify a factor causing the quality. In order to maintain high quality with high reproducibility even in a case where the robot executes each piece of work, it is preferable to learn a causal relationship between the quality and a series of motion parameters and acquire a proficiency model in which an influence factor is weighted.

Thus, in the present embodiment, in coordinate information of a region specified on an image showing the surface to be worked, quantitative and statistical evaluation data of the region is held as the attribute data. A means of collecting and analyzing the motion log including a motion trajectory of the robot device 22 that executes the work is included, and image coordinates of the surface to be worked are made to match with motion trajectory coordinates of the robot. Thus, it is possible to associate quality evaluation data of each region with the motion log of the robot device 22 in the region. Furthermore, by learning the combination sample, it is possible to clarify a causal relationship between quality and a motion parameter having a high influence on the quality.

Thus, according to the present embodiment, it is possible not only to evaluate superiority or inferiority of the quality of the work product but also to clarify the work factor that generates the result, and it is possible to lead to work improvement thereafter. In addition, by increasing the number of combination samples of the quality evaluation data and the motion log of the robot device 22 and applying the machine learning, it is possible to acquire a proficient robot motion model. As a result, high-quality work quality can be maintained with high reproducibility, and a high-quality product can be stably produced.

(Usage Example of the Quality Evaluation Data)

The obtained quality evaluation data is transmitted to the work information analysis unit 52 and the work evaluation unit 58 of the platform 50, and work evaluation of the operator is performed on the basis of a current work evaluation result. In addition, skill certification of the operator is performed. For example, as the motion history information of the robot, how much time has been required for the target work is associated from the motion history in addition to the quality evaluation data of the target work. Thus, such information can also be used for the worker evaluation. That is, with the same quality evaluation data, it is possible to certify that the skill of the operator is higher when the operation time of the robot is shorter.

In addition to the robot operation time, a movement trajectory of the arm manipulator 22b, unevenness of a movement speed, and the like can also be used as indexes of parameters used for the skill evaluation of the operator. The quality evaluation data is transmitted to the business operator-side terminal 10 and used for evaluation on the business operator side. The quality evaluation data may be associated with operator data and work contents data and stored in an operator DB 61 as data of a work history by the operator. At that time, recording together with a type of a communicator on an operator side (for example, being a dedicated controller dedicated to the work, a general-purpose controller, or the like) and information of a display device (for example, being a 2D display, a 3D display, a head-mounted display, or the like) may be performed. Furthermore, an autonomous motion of a target work robot may be performed by utilization of the proficiency model generated on the basis of the quality evaluation data.

<1-8. Action/Effect>

As described above, according to the present embodiment, the information processing system 1 includes the information processing unit (such as any of the units in the platform 50) that associates the quality evaluation information related to the quality evaluation of the product with respect to a region to be worked of a work target object (such as a surface to be cut of an object to be cut, a surface to be coated of an object to be coated, or the like) with the motion history information related to the motion history of the robot device 22 that performs work on the work target object. As a result, since combination data of the quality evaluation information and the motion history information is generated, correlation between the quality of the work product and the motion history can be grasped on the basis of the combination data. Thus, it is possible not only to evaluate superiority or inferiority of the quality of the work product but also to clarify the work factor that has caused the evaluation result, whereby it is possible to stably produce a product with good quality.

In addition, the quality evaluation information may be quality evaluation information related to quality evaluation of each planar region of the region to be worked, the motion history information may be motion history information related to a motion history of the robot device 22 for each planar region, and the information processing unit may associate the quality evaluation with the motion history for each planar region. As a result, it is possible to appropriately grasp the correlation between the quality of the work product and the motion history on the basis of the combination data of the quality evaluation information and the motion history information, and thus, it is possible to stably and reliably produce a product with good quality.

Furthermore, the information processing unit may match the position information of each planar region related to the quality evaluation information with the position information of each planar region related to the motion history information. As a result, combination data of the quality evaluation information and the motion history information can be obtained with high accuracy.

Furthermore, the quality evaluation information may include the characteristic statistical data of the pixel characteristic value of each planar region. As a result, the correlation between the quality of the work product and the motion history can be appropriately grasped on the basis of the combination data of the quality evaluation information and the motion history information.

In addition, the motion history information may include both or one of the trajectory history information related to the trajectory history of the manipulator (such as the arm manipulator 22b or the grinder 22f) included in the robot device 22 and the pressure history information related to the pressure history of the manipulator. As a result, the correlation between the quality of the work product and the motion history can be appropriately grasped on the basis of the combination data of the quality evaluation information and the motion history information.

Furthermore, the trajectory history information may include both or one of the coordinate history information related to the history of the spatial coordinates of the manipulator and the posture history information related to the posture history of the manipulator. As a result, the correlation between the quality of the work product and the motion history can be appropriately grasped on the basis of the combination data of the quality evaluation information and the motion history information.

In addition, the information processing unit may generate operator evaluation information on the basis of the quality evaluation information. As a result, the operator evaluation information can be appropriately obtained.

Furthermore, the information processing system 1 may further include the business operator-side device 20 that generates the motion history information. For example, the business operator-side device 20 generates the motion history information by the robot controller 23. As a result, since the motion history information can be appropriately obtained, the combination data of the quality evaluation information and the motion history information can be reliably obtained.

Furthermore, the information processing system 1 may further include an operator-side device 40 for the operator to remotely operate the robot device 22. As a result, since the robot device 22 can be remotely operated, it is possible to obtain the motion history information of a case where the robot device 22 is remotely operated.

Furthermore, the information processing unit may execute machine learning (such as deep learning) by using, as the learning data, the combination data in which the quality evaluation information and the motion history information are associated with each other. This makes it possible to generate a model based on the combination data of the quality evaluation information and the motion history information, whereby the model can be used for work. As a result, a product with good quality can be stably produced.

Furthermore, the information processing unit may generate a proficiency model related to the work of the robot device 22 by the machine learning. As a result, since the proficiency model can be used for the work, a product with good quality can be stably produced.

Furthermore, the proficiency model may be a model for the robot device 22 to automatically perform the work. As a result, since the proficiency model can be used for automatic control of the robot device 22, a product with good quality can be stably and reliably produced.

Furthermore, the information processing unit may generate the work evaluation model for evaluating the work of the robot device 22 by executing machine learning by using, as the learning data, the combination data in which the quality evaluation information and the motion history information are associated with each other. As a result, since the work evaluation model can be used for the work, a product with good quality can be stably produced.

Furthermore, the information processing unit may generate the work evaluation model by executing machine learning by using, as the learning data, the above-described combination data and the work monitoring data related to monitoring of the robot device 22 that performs the work. As a result, since it is possible to generate the work evaluation model based on the above-described combination data and the work monitoring data, it is possible to generate the appropriate work evaluation model.

In addition, the motion history information for generating the work evaluation model may include pieces of motion history information respectively associated with the region information of the first quality (such as good quality region information) and the region information of the second quality lower than the first quality (such as poor quality region information) included in the quality evaluation information. As a result, the appropriate work evaluation model can be generated.

Furthermore, the information processing unit may generate the work intention interpretation model for interpreting intention of the work of the robot device 22 by executing machine learning by using, as the learning data, the combination data in which the quality evaluation information and the motion history information are associated with each other and the operation intention information related to intention of the operator who operates the robot device 22. As a result, since the work intention interpretation model can be used for the work, a product with good quality can be stably produced.

Furthermore, the information processing unit may generate the work intention interpretation model by executing machine learning by using, as the learning data, the above-described combination data, the operation intention information, and the work monitoring data related to monitoring of the robot device 22 that performs the work. As a result, since it is possible to generate the work intention interpretation model based on the above-described combination data, the operation intention information, and the work monitoring data, it is possible to generate the appropriate work intention interpretation model.

In addition, the motion history information for generating the work intention interpretation model may include pieces of motion history information associated with the region information of the first quality (such as good quality region information) and the region information of the second quality lower than the first quality (such as poor quality region information) included in the quality evaluation information. As a result, an appropriate work intention interpretation model can be generated.

2. Other Embodiments

The processing according to the above-described embodiment (or variations) may be conducted in various different forms (variations) other than the above-described embodiment. For example, among pieces of processing described in the above-described embodiment, all or part of the processing described as being performed automatically can be performed manually, or all or part of the processing described as being performed manually can be performed automatically by a known method. In addition, the processing procedures, specific names, and information including various pieces of data and parameters in the above document and drawings can be optionally changed unless otherwise specified. For example, various pieces of information in each figure are not limited to the illustrated information.

Furthermore, each component of each illustrated apparatus is functional and conceptual, and does not necessarily need to be physically configured as illustrated. That is, the specific form of distribution/integration of each apparatus is not limited to the illustrated one, and all or part of the device can be configured in a functionally or physically distributed/integrated manner in any unit in accordance with various loads and use situations.

Furthermore, the above-described embodiment (or variations) can be appropriately combined as long as the processing contents do not contradict each other. Furthermore, the effects described in the present specification are merely examples and not limitations. Other effects may be exhibited.

3. Configuration Example of Hardware

Figure 19:
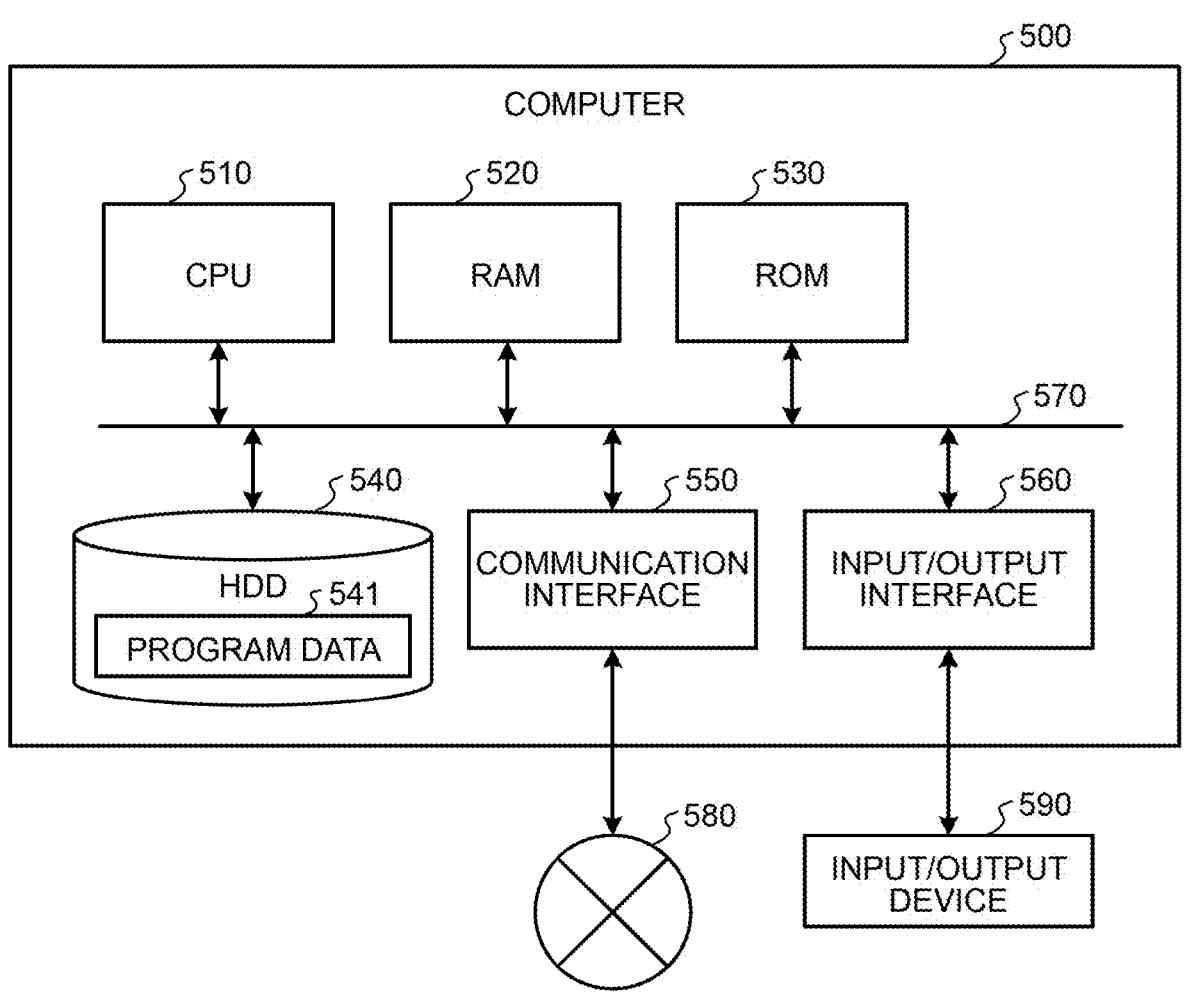
FIG. 19 is a view illustrating an example of a schematic configuration of hardware according to the embodiment of the present disclosure.

A specific hardware configuration example of an information device included in the business-operator-side terminal 10, the business-operator-side apparatus 20, the operator-side terminal 30, the operator-side apparatus 40, and the platform 50 according to the above-described embodiment (or variations) will be described. The information device may be implemented by, for example, a computer 500 having a configuration as illustrated in FIG. 19. FIG. 19 illustrates a configuration example of hardware that implements the functions of the information device.

As illustrated in FIG. 19, the computer 500 includes a CPU 510, a RAM 520, a read only memory (ROM) 530, a hard disk drive (HDD) 540, a communication interface 550, and an input/output interface 560. Units of the computer 500 are connected by a bus 570.

The CPU 510 operates based on a program stored in the ROM 530 or the HDD 540, and controls each unit. For example, the CPU 510 develops the program stored in the ROM 530 or the HDD 540 on the RAM 520, and executes processing corresponding to various programs.

The ROM 530 stores a boot program such as a basic input output system (BIOS) executed by the CPU 510 at the time when the computer 500 is activated, a program depending on the hardware of the computer 500, and the like.

The HDD 540 is a computer-readable recording medium that non-transiently records a program executed by the CPU 510, data used by the program, and the like. Specifically, the HDD 540 is a recording medium that records an information processing program according to the present disclosure. The information processing program is one example of program data 541.

The communication interface 550 is used for connecting the computer 500 with an external network 580 (e.g., Internet). For example, the CPU 510 receives data from another device and transmits data generated by the CPU 510 to another device via the communication interface 550.

The input/output interface 560 connects an input/output device 590 with the computer 500. For example, the CPU 510 receives data from an input device such as a keyboard and a mouse via the input/output interface 560. Furthermore, the CPU 510 transmits data to an output device such as a display, a speaker, and a printer via the input/output interface 560.

Note that, the input/output interface 560 may function as a medium interface that reads a program and the like recorded in a predetermined recording medium. Examples of the medium includes an optical recording medium such as a digital versatile disc (DVD) and a phase change rewritable disk (PD), a magneto-optical recording medium such as a magneto-optical disk (MO), a tape medium, a magnetic recording medium, and a semiconductor memory. Here, for example, when the computer 500 functions as an information device, the CPU 510 of the computer 500 implements all or a part of the functions of each unit according to the embodiment (or variations) by executing an information processing program loaded on the RAM 520. Furthermore, the HDD 540 stores an information processing program according to the present disclosure and data. Note that the CPU 510 reads the program data 541 from the HDD 540 and executes the program data 541. In another example, the CPU 510 may acquire these programs from another apparatus via the external network 580.

4. Supplementary Note

Note that the present technology can also have the following configurations.

(1)

An information processing system comprising:

an information processing unit that associates quality evaluation information related to quality evaluation of a product for a region to be worked of a work target object with motion history information related to a motion history of a robot device that performs work on the work target object.

(2)

The information processing system according to (1), wherein the quality evaluation information is quality evaluation information related to the quality evaluation for each of planar regions of the region to be worked, the motion history information is motion history information related to the motion history of the robot device for each of the planar regions, and the information processing unit associates the quality evaluation with the motion history for each of the planar regions.

(3)

The information processing system according to (2), wherein the information processing unit matches position information of each of the planar regions related to the quality evaluation information with position information of each of the planar regions related to the motion history information.

(4)

The information processing system according to (2), wherein the quality evaluation information includes characteristic statistical data of a pixel characteristic value of each of the planar regions.

(5)

The information processing system according to any one of (1) to (4), wherein the motion history information includes both or one of trajectory history information related to a trajectory history of a manipulator included in the robot device and pressure history information related to a pressure history of the manipulator.

(6)

The information processing system according to (5), wherein the trajectory history information includes both or one of coordinate history information related to a history of spatial coordinates of the manipulator and posture history information related to a posture history of the manipulator.

(7)

The information processing system according to any one of (1) to (6), wherein the information processing unit generates operator evaluation information on a basis of the quality evaluation information.

(8)

The information processing system according to any one of (1) to (7), further comprising a business operator-side device that generates the motion history information.

(9)

The information processing system according to any one of (1) to (8), further comprising an operator-side device for an operator to remotely operate the robot device.

(10)

The information processing system according to any one of (1) to (9), wherein the information processing unit executes machine learning by using, as learning data, combination data in which the quality evaluation information and the motion history information are associated with each other.

(11)

The information processing system according to (10), wherein the information processing unit generates a proficiency model related to the work of the robot device by the machine learning.

(12)

The information processing system according to (11), wherein the proficiency model is a model for the robot device to automatically perform the work.

(13)

The information processing system according to any one of (1) to (12), wherein the information processing unit executes machine learning by using, as learning data, combination data in which the quality evaluation information and the motion history information are associated with each other, and generates a work evaluation model for evaluating the work of the robot device.

(14)

The information processing system according to (13), wherein the information processing unit executes the machine learning by using, as learning data, the combination data and work monitoring data related to monitoring of the robot device that performs the work.

(15)

The information processing system according to (13) or (14), wherein the motion history information includes pieces of motion history information respectively associated with region information of first quality and region information of second quality lower than the first quality, the region information being included in the quality evaluation information.

(16)

The information processing system according to any one of (1) to (15), wherein the information processing unit executes machine learning by using, as learning data, combination data in which the quality evaluation information and the motion history information are associated with each other and operation intention information related to intention of an operator who operates the robot device, and generates a work intention interpretation model for interpreting intention of the work of the robot device.

(17)

The information processing system according to (16), wherein the information processing unit executes the machine learning by using, as learning data, the combination data, the operation intention information, and work monitoring data related to monitoring of the robot device that performs the work.

(18)

The information processing system according to (16) or (17), wherein the motion history information includes pieces of motion history information respectively associated with region information of first quality and region information of second quality lower than the first quality, the region information being included in the quality evaluation information.

(19)

An information processing device comprising:

an information processing unit that associates quality evaluation information related to quality evaluation of a product for a region to be worked of a work target object with motion history information related to a motion history of a robot device that performs work on the work target object.

(20)

A data generation method comprising:

associating quality evaluation information related to quality evaluation of a product for a region to be worked of a work target object with motion history information related to a motion history of a robot device that performs work on the work target object.

(21)

An information processing device including a component according to the information processing system according to any one of (1) to (18).

(22)

A data generation method using the information processing system according to any one of (1) to (18).

REFERENCE SIGNS LIST

1 INFORMATION PROCESSING SYSTEM
10 BUSINESS OPERATOR-SIDE TERMINAL
11 DISPLAY UNIT
12 INPUT UNIT
13 COMMUNICATION UNIT
20 BUSINESS OPERATOR-SIDE DEVICE
21 SITUATION MONITORING DEVICE
21a IMAGING UNIT
21b IMAGING UNIT
21c ILLUMINATION
22 ROBOT DEVICE
22a COMMUNICATION UNIT
22b ARM MANIPULATOR
22c VARIOUS SENSOR
22d MOVING UNIT
22e CONTROL UNIT
22f GRINDER
23 ROBOT CONTROLLER
23a COMMUNICATION UNIT
23b VIDEO PROCESSING UNIT
23c CONTROL INFORMATION PROCESSING UNIT
23d ROBOT CONTROL MODEL
30 OPERATOR-SIDE TERMINAL
31 DISPLAY UNIT
32 INPUT UNIT
33 COMMUNICATION UNIT
40 OPERATOR-SIDE DEVICE
41 DISPLAY DEVICE
41a DISPLAY UNIT
42 COMMUNICATOR
42a COMMUNICATION UNIT
42b TACTILE/FORCE PRESENTATION UNIT
42c OPERATION AUTHENTICATION UNIT
42d OPERATION RECEPTION DEVICE
42e CONTROL UNIT
43 ROBOT CONTROLLER
43a COMMUNICATION UNIT
43b VIDEO PROCESSING UNIT
43c CONTROL INFORMATION PROCESSING UNIT
43d ASSIST INFORMATION GENERATION MODEL
50 PLATFORM
51 COMMUNICATION UNIT
52 WORK INFORMATION ANALYSIS UNIT
53 DATA ANALYSIS UNIT
54 DEVICE LOG DB
55 VIDEO ANALYSIS UNIT
56 VIDEO DB
57 TEACHING MATERIAL PROVIDING UNIT
58 WORK EVALUATION UNIT
59 SKILL CERTIFICATION UNIT
60 BADGE MANAGEMENT UNIT
61 OPERATOR DB
62 REQUESTOR DB
63 JOB MATCHING UNIT
101 STEREO CAMERA
102 ToF SENSOR
103 PROJECTOR
104 MONOCULAR CAMERA
111 ILLUMINATION
112 CAMERA
121 MULTISPECTRAL CAMERA
131 POLARIZATION CAMERA a1 TARGET AREA
b1 REFERENCE POINT
b2 REFERENCE POINT
b3 REFERENCE POINT
b4 REFERENCE POINT
c1 TRAJECTORY
G1 IMAGE
G2 IMAGE
N NETWORK
W1 OBJECT TO BE GROUND
W2 OBJECT TO BE COATED

The invention claimed is:

1. An information processing system comprising:
a memory storing a program, and
at least one processor configured to execute the program to perform operations comprising:
for each respective region of a plurality of defined regions included in a work target object, performing an association of quality evaluation information for the respective region with motion history information of a robot device corresponding to motion performed in the respective region; and
generating a robot control command responsive to the association for adjusting operation of the robot device during work on the work target object.

2. The information processing system according to claim 1, wherein
the quality evaluation information is quality evaluation information related to a quality evaluation for each of planar regions of a region to be worked,
the motion history information is motion history information related to a motion history of the robot device for each of the planar regions, and
the operations further comprise associating the quality evaluation with the motion history for each of the planar regions.

3. The information processing system according to claim 2, wherein the operations further comprise:
matching position information of each of the planar regions related to the quality evaluation information with position information of each of the planar regions related to the motion history information.

4. The information processing system according to claim 2, wherein the quality evaluation information includes characteristic statistical data of a pixel characteristic value of each of the planar regions.

5. The information processing system according to claim 1, wherein the motion history information includes both or one of trajectory history information related to a trajectory history of a manipulator included in the robot device and pressure history information related to a pressure history of the manipulator.

6. The information processing system according to claim 5, wherein the trajectory history information includes both or one of coordinate history information related to a history of spatial coordinates of the manipulator and posture history information related to a posture history of the manipulator.

7. The information processing system according to claim 1, wherein the operations further comprise:
generating operator evaluation information on a basis of the quality evaluation information.

8. The information processing system according to claim 1, further comprising a business operator-side device that generates the motion history information.

9. The information processing system according to claim 1, further comprising an operator-side device for an operator to remotely operate the robot device.

10. The information processing system according to claim 1, wherein the operations comprise:
executing machine learning by using, as learning data, combination data in which the quality evaluation information and the motion history information are associated with each other.

11. The information processing system according to claim 10, wherein the operation further comprise:
generating a proficiency model related to the work of the robot device by the machine learning.

12. The information processing system according to claim 11, wherein the proficiency model is a model for the robot device to automatically perform the work.

13. The information processing system according to claim 1, wherein the operations further comprise:
executing machine learning by using, as learning data, combination data in which the quality evaluation information and the motion history information are associated with each other, and generating a work evaluation model for evaluating the work of the robot device.

14. The information processing system according to claim 13, wherein the operations further comprise:
executing the machine learning by using, as learning data, the combination data and work monitoring data related to monitoring of the robot device that performs the work.

15. The information processing system according to claim 13, wherein the motion history information includes pieces of motion history information respectively associated with region information of a first quality and region information of a second quality lower than the first quality, the region information being included in the quality evaluation information.

16. The information processing system according to claim 1, wherein the operations further comprise:
executing machine learning by using, as learning data, combination data in which the quality evaluation information and the motion history information are associated with each other and operation intention information related to intention of an operator who operates the robot device, and generating a work intention interpretation model for interpreting intention of the work of the robot device.

17. The information processing system according to claim 16, wherein the operations further comprise:
executing the machine learning by using, as learning data, the combination data, the operation intention information, and work monitoring data related to monitoring of the robot device that performs the work.

18. The information processing system according to claim 16, wherein the motion history information includes pieces of motion history information respectively associated with region information of first quality and region information of second quality lower than the first quality, the region information being included in the quality evaluation information.

19. A data generation method comprising:
for each respective region of a plurality of defined regions included in a work target object, performing an association of quality evaluation information for the respective region with motion history information of a robot device corresponding to motion performed in the respective region; and
generating a robot control command responsive to the association for adjusting operation of the robot device during work on the work target object.

20. A non-transitory computer readable medium including a program for data generation, the program being executable by a processor to perform operations comprising:

for each respective region of a plurality of defined regions included in a work target object, performing an asso- ciation of quality evaluation information for the respective region with motion history information of a robot device corresponding to motion performed in the respective region; and generating a robot control command responsive to the association for adjusting operation of the robot device during work on the work target object.

\* \* \* \* \*